(12) United States Patent
Hamamoto

(10) Patent No.: US 12,196,273 B2
(45) Date of Patent: Jan. 14, 2025

(54) ROTATION ASSIST TOOL AND ASSIST-ATTACHED ROTATION TOOL

(71) Applicant: FREEPOWER INNOVATIONS CO. LTD., Miyazaki (JP)

(72) Inventor: Yoichiro Hamamoto, Miyazaki (JP)

(73) Assignee: FREEPOWER INNOVATIONS CO. LTD., Miyazaki (JP)

( * ) Notice: Subject to any disclaimer, the term of this patent is extended or adjusted under 35 U.S.C. 154(b) by 473 days.

(21) Appl. No.: 17/620,280

(22) PCT Filed: Oct. 22, 2020

(86) PCT No.: PCT/JP2020/039779
§ 371 (c)(1),
(2) Date: Dec. 17, 2021

(87) PCT Pub. No.: WO2021/079949
PCT Pub. Date: Apr. 29, 2021

(65) Prior Publication Data
US 2022/0364608 A1 Nov. 17, 2022

(30) Foreign Application Priority Data
Oct. 23, 2019 (JP) ................................ 2019-192866

(51) Int. Cl.
*F16D 3/12* (2006.01)
*B25B 21/00* (2006.01)
*F16D 3/68* (2006.01)

(52) U.S. Cl.
CPC ............. *F16D 3/12* (2013.01); *B25B 21/00* (2013.01); *F16D 3/68* (2013.01)

(58) Field of Classification Search
CPC .............. F16D 3/12; F16D 3/68; B25B 21/00
(Continued)

(56) References Cited

U.S. PATENT DOCUMENTS

| 2,270,140 A | 1/1942 | Piron |
| 2,397,642 A * | 4/1946 | Blazek ................ F16D 13/686 464/83 |

(Continued)

FOREIGN PATENT DOCUMENTS

| CN | 102756352 A | 10/2012 |
| DE | 102006026946 A1 | 12/2007 |

(Continued)

OTHER PUBLICATIONS

Extended (Supplementary) European Search Report dated Nov. 15, 2023, issued in counterpart EP Application No. 20879183.0. (7 pages).

(Continued)

*Primary Examiner* — Greg Binda
(74) *Attorney, Agent, or Firm* — WHDA, LLP

(57) ABSTRACT

A rotation assist tool 10 attached to a base side of a rotary shaft 12 having an output unit 11 on a front side thereof and a assist-attached rotation tool 31 including the rotation assist tool 10. The rotation assist tool 10 has a first rotating body 13; a second rotating body 14 that is held by the first rotating body 13 to be rotatable in forward and reverse directions; and at least one elastically deformable body 22 that is elastically deformed as the first rotating body 13 and the second rotating body 14 rotate relative to each other, and transmits rotation between the first rotating body 13 and the second rotating body 14, wherein the base side of the rotary shaft 12 is fixed to the first rotating body 13.

8 Claims, 31 Drawing Sheets

(58) Field of Classification Search
USPC .................. 81/480; 464/57, 83, 85
See application file for complete search history.

(56) References Cited

U.S. PATENT DOCUMENTS

| | | | | |
|---|---|---|---|---|
| 2,806,365 | A | * | 9/1957 | Hennig .............. F16D 3/68 |
| | | | | 464/83 |
| 2,991,637 | A | * | 7/1961 | Lochow .............. F16D 3/72 |
| | | | | 464/57 |
| 5,545,089 | A | * | 8/1996 | Kirschey ............ F16D 3/68 |
| | | | | 464/83 |
| 2007/0062776 | A1 | | 3/2007 | Chen |
| 2007/0089699 | A1 | | 4/2007 | Satoh et al. |
| 2010/0113164 | A1 | | 5/2010 | Rothe et al. |
| 2013/0112448 | A1 | | 5/2013 | Profunser et al. |
| 2017/0056979 | A1 | | 3/2017 | Krause et al. |
| 2017/0096862 | A1 | | 4/2017 | Butt et al. |
| 2017/0266790 | A1 | | 9/2017 | Chuang |

FOREIGN PATENT DOCUMENTS

| | | |
|---|---|---|
| DE | 102012212615 A1 | 2/2013 |
| EP | 2407071 A1 | 1/2012 |
| JP | 49-11138 U | 1/1974 |
| JP | 54-73596 U | 5/1979 |
| JP | 4-46221 A | 2/1992 |
| JP | 11-170880 A | 6/1999 |
| JP | 2008-279560 A | 11/2008 |
| JP | 3175841 U | 5/2012 |
| JP | 2014-145437 A | 8/2014 |
| JP | 2019-94967 A | 6/2019 |
| TW | M283934 | 12/2005 |
| TW | I273055 B | 2/2007 |
| TW | M522105 U | 5/2016 |
| TW | M534787 U | 1/2017 |
| TW | M543147 U | 6/2017 |
| TW | I659893 B | 5/2019 |

OTHER PUBLICATIONS

Office Action dated Jan. 28, 2023, issued in counterpart CN application No. 202080044356.9, with English translation. (20 pages).
International Search Report dated Dec. 28, 2020, issued in counterpart International Application No. PCT/JP2020/039779, with English Translation. (7 pages).
Notice of the Opinion on Examination dated Sep. 9, 2021, issued in counterpart Taiwanese Application No. 109136724, with English translation. (12 pages).

* cited by examiner

ROTATION ASSIST TOOL AND ASSIST-ATTACHED ROTATION TOOL

TECHNICAL FIELD

The present invention relates to a rotation assist tool capable of efficiently utilizing rotational energy input from the outside and an assist-attached rotation tool provided with the rotation assist tool.

BACKGROUND ART

Instead of conventional manual screwdrivers, electric screwdrivers are used at construction sites and the like in recent years in order to shorten work time and improve work efficiency, and to reduce the burden on operators and save labor.

The electric screwdrivers are mainly used for tightening screws at construction sites and the like. It is known that by connecting the output shaft of the motor and the screwdriver bit via a torsion coil spring, the impact caused by the reaction at the time of tightening the screw can be alleviated and the tightening torque of the screw can be stabilized. However, the electric screwdriver is used not only for tightening the screw but also for removing it, and the screwdriver bit rotates in forward and reverse directions. Therefore, there is a problem that the torsion coil spring is easily damaged due to the repeated alternating load. Additionally, there is also a problem that the rotation of the output shaft is not easily transmitted to the screwdriver bit, the force to loosen the screw becomes weakened, and workability is reduced, since the torsion coil spring is twisted and deformed in the direction of increasing the outer diameter thereof when removing (loosening) the screw.

Therefore, for example, Patent Document 1 discloses an electric screwdriver in which a torsion coil spring is interposed in series in the power transmission mechanism between the output shaft of the motor and the screwdriver bit so that the diameter of the torsion coil spring becomes smaller when the torsion coil soling is received a torsion force in the screw tightening direction, and a non-fixed sleeve is fitted and arranged around the torsion coil spring.

CITATION LIST

Patent Document

Patent Document 1: Japanese Unexamined Utility Model Application Publication No. Sho 54-073596

SUMMARY OF INVENTION

Technical Problem

In the electric screwdriver of Patent Document 1, the torsion coil spring is twisted and deformed in a direction of decreasing the outer diameter thereof only when the screw is tightened, and when the screw is removed, the deformation (expansion) is restricted by the non-fixed sleeve. Therefore, the repeated alternating load does not act, and damage is less likely to occur. Furthermore, since the outer diameter of the torsion coil spring hardly changes when the screw is removed (loosened), the rotation of the output shaft is easily transmitted to the screwdriver bit, and the screw can be efficiently loosened with a strong force.

However, although such an electric screwdriver is convenient, it is mainly used by a trader or the like, and is not widely used in general households or the like. In particular, it was unfamiliar to young people, women, the elderly, etc., it took time to get used to it, and it was not easy to use.

On the other hand, in most electric rotary tools such as small drills and hand mixers, the rotary shaft of the tool is simply connected to the output shaft of the motor to rotate the tool, and a structure for efficiently transmitting the input energy from the motor to the rotary shaft, a structure for reducing the load applied to the motor when the rotary shaft rotates, and the like have not been studied.

Moreover, with a rotation tool such as a reel for fishing or a winch, in which the tip side of the rotary shaft is used as the input unit or an input unit such as a handle is attached to the tip side of the rotary shaft, and the rotary shaft is rotated manually or electrically to wind a fishing line, rope, wire, etc., a large resistance is applied at the time of initial movement or during operation, and the rotation may become unstable or stop.

The present invention has been made in consideration of the above circumstances, and an object thereof is to provide a rotation assist tool capable of efficiently transmitting rotational energy input from the outside and an assist-attached rotation tool with excellent labor saving that can improve the stability of operation and the efficiency of rotation transmission, and effectively utilize the input energy by equipping this rotation assist tool.

Solution to Problem

In order to achieve the above object, according to a first aspect of the present invention, there is provided a rotation assist tool attached to a base side of a rotary shaft having an output unit or an input unit on a front side thereof, comprising:
 a first rotating body;
 a second rotating body held by the first rotating body to be rotatable in forward and reverse directions; and
 at least one elastically deformable body elastically deformed by relative rotation of the first rotating body and the second rotating body and transmitting rotation between the first rotating body and the second rotating body,
 wherein the base side of the rotary shaft is fixed to the first rotating body or the second rotating body.

Here, the rotation assist tool can transmit the rotational energy input to the first rotating body or the second rotating body to the second rotating body or the first rotating body via the elastically deformable body, and rotate the rotary shaft fixed to the second rotating body or the first rotating body to output from the output unit. Further, the rotation assist tool can also rotate the first rotating body or the second rotating body together with the rotary shaft when rotational energy is input from the rotary shaft (input unit), and transfer the rotational energy to the second rotating body or the first rotating body via the elastically deformable body to output.

In the rotation assist tool according to the first aspect of the present invention, it is preferred that the first rotating body include a main body portion with a rotary shaft mounting portion for fixing the base side of the rotary shaft and one or more first convex portions provided on an outer circumference of the main body portion;
 the second rotating body include an outer cylindrical portion coveting an outer circumference of the first rotating body and one or more second convex portions provided on an inner circumference of the outer cylindrical portion and each arranged alternately with each of the first convex portions; and the respective elastically deformable bodies be arranged between the respective first convex portions and the respective second convex portions.

In the rotation assist tool according to the first aspect of the present invention, the first rotating body may include a main body portion and one or more first convex portions provided on an outer circumference of the main body portion;

the second rotating body may include an outer cylindrical portion covering an outer circumference of the first rotating body on one side thereof and a rotary shaft mounting portion for fixing the base side of the rotary shaft on another side thereof, and one or more second convex portions each arranged alternately with each of the first convex portions may be provided on an inner circumference of the outer cylindrical portion; and the respective elastically deformable bodies may be arranged between the respective first convex portions and the respective second convex portions.

In the rotation assist tool according to the first aspect of the present invention, it is preferred that the first rotating body include a main body portion with a rotary shaft mounting portion for fixing the base side of the rotary shaft, a plurality of arc-shaped space portions penetrating the main body portion in an axial direction and curved concentrically around an axial center of the main body portion be formed in the main body portion, and each of the elastically deformable bodies be housed on one side and another side in a circumferential direction in each of the space portions;

the second rotating body include rotating plates on one side and another side arranged to face each other on both sides in the axial direction of the main body portion, and a plurality of connecting shafts each passing between the elastically deformable bodies housed on the one side and the another side in the circumferential direction in each of the space portions, penetrating the space portion and connecting the rotating plates on the one side and the another side; and the base side of the rotary shaft penetrate the rotating plate on the one side and is fixed to the main body portion, and the second rotating body be rotatable in forward and reverse directions with respect to the rotary shaft and the first rotating body.

In the rotation assist tool according to the first aspect of the present invention, the first rotating body may include a main body portion externally inserted on the base side of the rotary shaft and held so as to rotate in forward and reverse directions, a plurality of arc-shaped space portions penetrating the main body portion in an axial direction and curved concentrically around an axial center of the main body portion may be formed in the main body portion, and each of the elastically deformable bodies may be housed on one side and another side in a circumferential direction in each of the space portions;

the second rotating body may include rotating plates on one side and another side arranged to face each other on both sides in the axial direction of the main body portion and fixed to the rotary shaft, and a plurality of connecting shafts each passing between the elastically deformable bodies housed on the one side and the another side in the circumferential direction in each of the space portions, penetrating the space portion and connecting the rotating plates on the one side and the another side.

In the rotation assist tool according to the first aspect of the present invention, it is further preferred that the first and the second rotating bodies include at least one set of guide means, the guide means of the first rotating body and the guide means of the second rotating body being engaged with each other, the set of guide means moving the second rotating body toward one side of the first rotating body while rotating the second rotating body during forward and reverse rotations of the second rotating body located on another side of the first rotating body, or the set of guide means moving the first rotating body located on one side of the second rotating body toward another side of the second rotating body while rotating the first rotating body during forward and reverse rotations of the first rotating body.

In the rotation assist tool according to the first aspect of the present invention, the first rotating body can include a pressed portion pressed toward a front side of the rotary shaft by the second rotating body upon the second rotating body moving to the one side of the first rotating body, and the second rotating body can include a pressed portion pressed toward a front side of the rotary shaft by the first rotating body upon the first rotating body moving to the another side of the second rotating body.

In the rotation assist tool according to the first aspect of the present invention, it is preferred that the first rotating body include a main body portion with a rotary shaft mounting portion for fixing the base side of the rotary shaft on one side thereof;

the second rotating body include an outer cylindrical portion covering the outer circumference of the first rotating body;

the elastically deformable body include a first elastically deformable portion attached helically between the main body portion and the outer cylindrical portion and a second elastically deformable portion attached helically between the main body portion and the outer cylindrical portion;

one side in a longitudinal direction of the first elastically deformable portion be fixed to an inner circumferential surface of the outer cylindrical portion, another side be fixed to an outer circumferential surface of the main body portion, and the first elastically deformable portion deform from a neutral state toward a direction of reducing a diameter thereof during a forward rotation of the second rotating body and deform from a neutral state toward a direction of increasing a diameter thereof during a reverse rotation of the second rotating body; and one side in a longitudinal direction of the second elastically deformable portion be fixed to an outer circumferential surface of the main body portion, another side be fixed to an inner circumferential surface of the outer cylindrical portion, and the second elastically deformable portion deform from a neutral state toward a direction of increasing a diameter thereof during a forward rotation of the second rotating body and deform from a neutral state toward a direction of reducing a diameter thereof during a reverse rotation of the second rotating body.

In the rotation assist tool according to the first aspect of the present invention, the first rotating body may include a main body portion;

the second rotating body may include an outer cylindrical portion covering the outer circumference of the first rotating body on one side thereof and a rotary shaft mounting portion for fixing the base side of the rotary shaft on another side thereof;

the elastically deformable body may include a first elastically deformable portion attached helically between the main body portion and the outer cylindrical portion and a second elastically deformable portion attached helically between the main body portion and the outer cylindrical portion;

one side in a longitudinal direction of the first elastically deformable portion may be fixed to an inner circumferential surface of the outer cylindrical portion, another side may be fixed to an outer circumferential surface of the main body portion, and the first elastically deformable portion may deform from a neutral state toward a direction of reducing a diameter thereof during a forward rotation of the first rotating body and may deform from a neutral state toward a direction of increasing a diameter thereof during a reverse rotation of the first rotating body; and one side in a longitudinal direction of the second elastically deformable portion may be fixed to an outer circumferential surface of the main body portion, another side may be fixed to an inner circumferential surface of the outer cylindrical portion, and the second elastically deformable portion may deform from a neutral state toward a direction of increasing a diameter thereof during a forward rotation of the first rotating body and may deform from a neutral state toward a direction of reducing a diameter thereof during a reverse rotation of the first rotating body.

In the rotation assist tool according to the first aspect of the present invention, the second rotating body can have a drive means connecting portion for connecting a rotation drive means, and the first rotating body can have a drive means connecting portion for connecting a rotation drive means.

In order to achieve the above object, according to a second aspect of the present invention, there is provided an assist-attached rotation tool comprising the rotation assist tool according to the first aspect of the present invention provided on a base side of a rotary shaft having an output unit or an input unit on a front side thereof.

In the assist-attached rotation tool according to the second aspect of the present invention, the rotary shaft may be formed integrally with the rotation assist tool.

Advantageous Effects of Invention

In the case of the rotation assist tool according to the first aspect of the present invention and the assist-attached rotation tool according to the second aspect of the present invention, while the first rotating body and the second rotating body rotate relative to each other (forward and reverse rotations), the elastically deformable body can be elastically deformed to store a part of the input energy and to reduce the load at the time of initial movement. By appropriately restoring the elastically deformable body during the rotation of the first and second rotating bodies, the accumulated elastic energy can be converted into rotational energy and the energy can be effectively used to reduce the input energy. At the same time, even if the input energy becomes small or is about to be interrupted, the fluctuation of the output energy can be suppressed and the rotation can be stabilized.

DESCRIPTION OF EMBODIMENTS

Figure 1A:
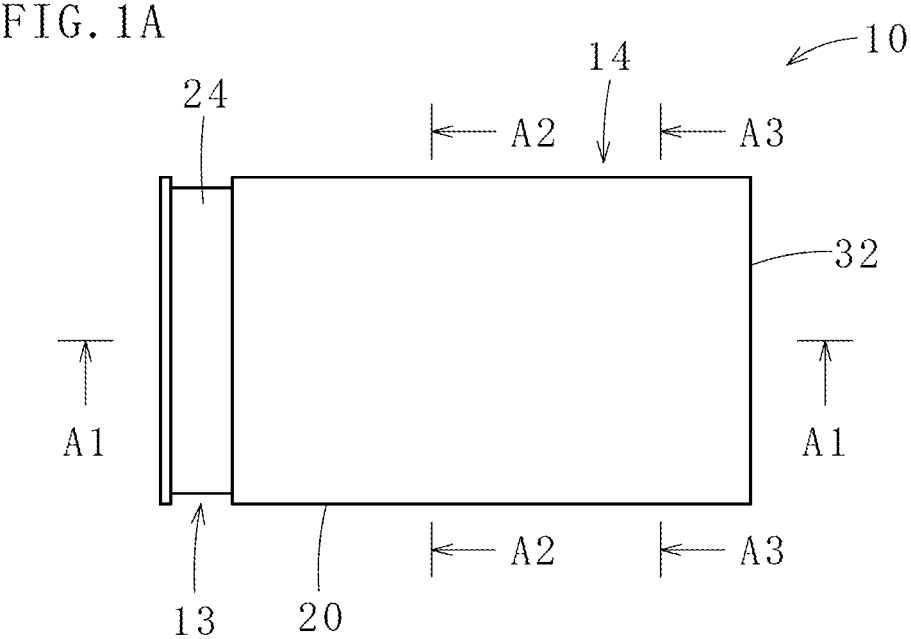
FIG. 1A is a plan view of a rotation assist tool according to a first embodiment of the present invention.

Subsequently, with reference to the accompanying drawings, descriptions will be given on embodiments of the present invention for a better understanding of the present invention.

A rotation assist tool 10 according to a first embodiment of the present invention illustrated in FIGS. 1A, 1B, 2A, 2B, and 3 is attached to the base side of a rotary shaft 12 having an output unit 11 similar to a flat-bladed screwdriver on the front side of the rotary shaft 12, and efficiently transmits the input energy to the rotary shaft 12 and output as illustrated in FIGS. 4A, 4B, 5A and 5B.

As illustrated in FIGS. 1, 2, 4B, and 5, the rotation assist tool 10 has a first rotating body 13 and a second rotating body 14 held by the first rotating body 13 so as to be able to rotate in the forward and reverse directions. Then, as illustrated in FIGS. 1B, 2A, 3, 4B, and 5A, the first rotating body 13 includes a main body portion 16 with a rotary shaft mounting portion 15 for fixing the base side of the rotary shaft 12, and a plurality of (three in this case) first convex portions 17 provided on the outer circumference of the main body portion 16. In this embodiment, the rotary shaft mounting portion 15 is formed at the axis of the cylindrical main body portion 16 and has a hexagonal hole shape according to the shape of a hexagonal columnar shaft fixing portion 18 that is formed on the base side of the rotary shaft 12 and fitted to the rotary shaft mounting portion 15. However, the shape and size of the rotary shaft mounting portion can be appropriately selected according to the shape and size of the shaft fixing portion. Furthermore, the rotary shaft mounting portion only needs to be able to fix the base side of the rotary shaft, and the fixing method can be appropriately selected.

Figure 1B:
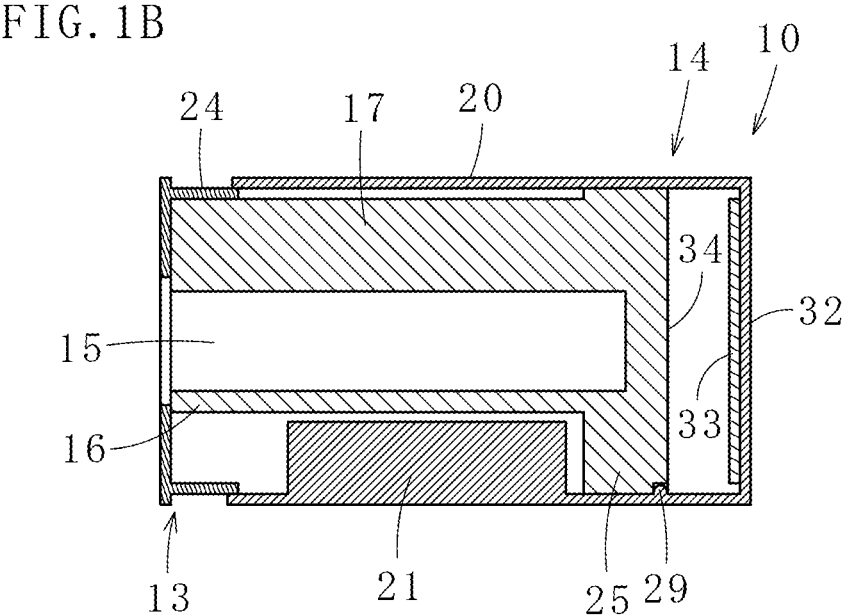
FIG. 1B is an end view taken along the line A1-A1 of FIG. 1A.
Figure 2A:
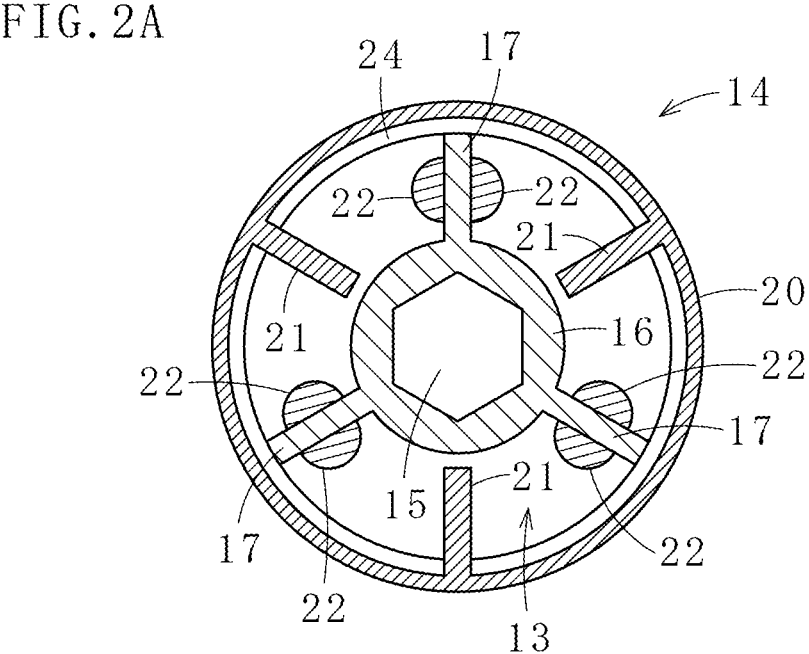
FIG. 2A is a cross-sectional view taken along the line A2-A2 of FIG. 1A.
Figure 3:
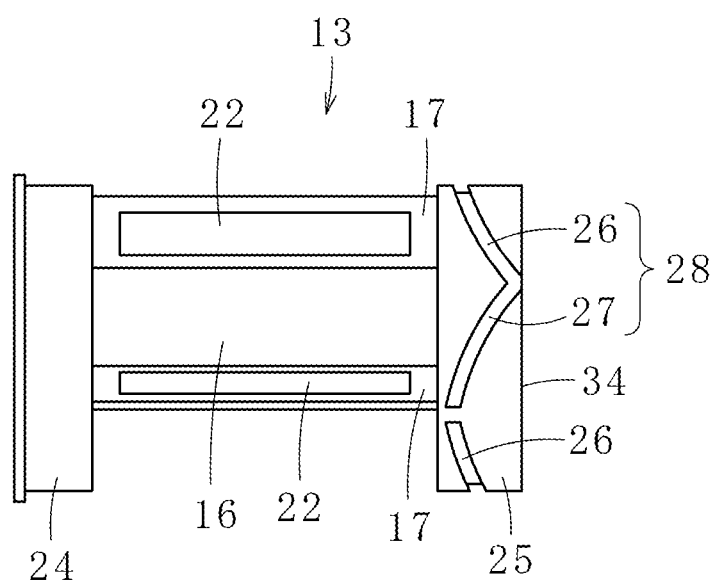
FIG. 3 is a side view showing a first rotating body of the rotation assist tool.
Figure 5A:
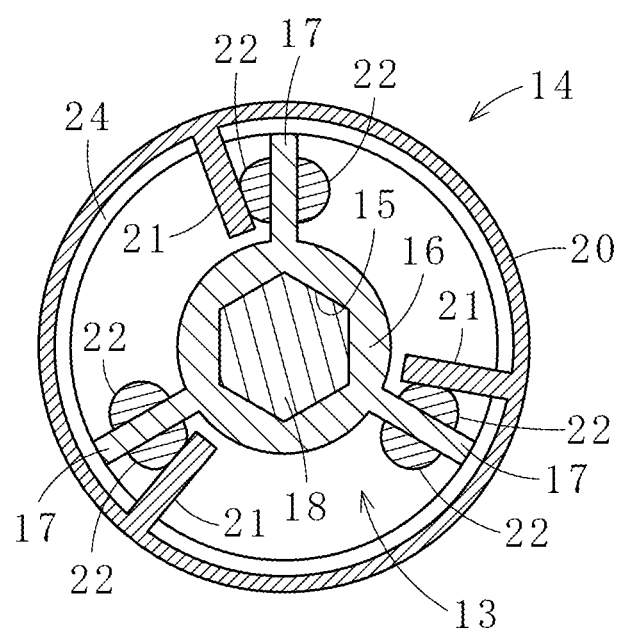
FIG. 5A is a cross-sectional view taken along the line B2-B2 of FIG. 4A.

Moreover, as illustrated in FIGS. 1B, 2A, and 5A, the second rotating body 14 includes an outer cylindrical portion 20 that covers the outer circumference of the first rotating body 13, and a plurality of (three in this case) second convex portions 21 provided on the inner circumference of the outer cylindrical portion 20 and each arranged alternately with each of the first convex portions 17. And elastically deformable bodies 22 each are arranged between each of the first convex portions 17 and each of the second convex portions 21 as illustrated in FIGS. 2A and 5A. In this embodiment, as illustrated in FIGS. 2A, 3 and 5A, each of the elastically deformable bodies 22 has a semicircular cross section and is attached to the front and back surfaces of each of the first convex portions 17 along the longitudinal direction of the first convex portion 17, but its shape and length can be appropriately selected. For example, each elastically deformable body can also be attached intermittently in the longitudinal direction of each first convex portion. Further, each elastically deformable body may be attached to the front and back surfaces of each second convex portion. As a member of the elastically deformable body 22, an elastomer is preferable. A thermoplastic elastomer is more preferably used, but synthetic rubber such as butadiene rubber, urethane rubber, and silicone rubber can also be used. The number of the first and second convex portions can be appropriately selected, and may be one for each. Moreover, when the first and second rotating bodies have a plurality of first and second convex portions, respectively, the first and second convex portions are arranged at equal angular intervals.

With the above configuration, in the rotation assist tool 10, the elastically deformable bodies 22 are elastically deformed due to the relative rotation of the first rotating body 13 and the second rotating body 14, and the rotation can be transmitted between the first rotating body 13 and the second rotating body 14 as illustrated in FIGS. 2A and 5A.

Figure 2B:
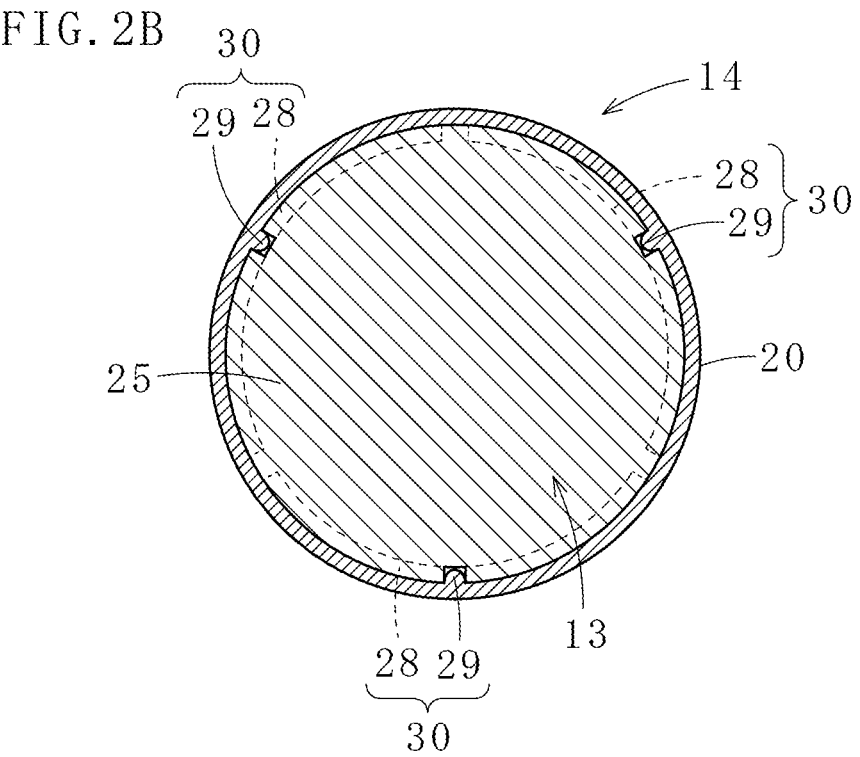
FIG. 2B is a cross-sectional view taken along the line A3-A3 of FIG. 1A.
Figure 4B:
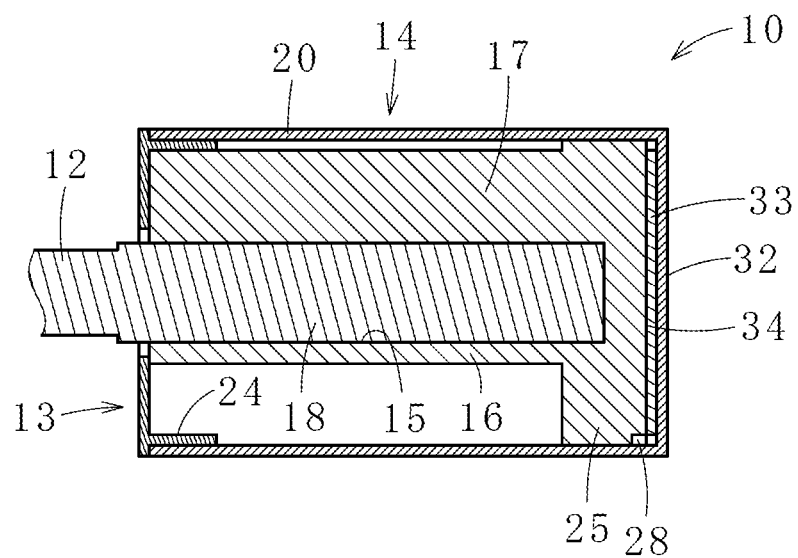
FIG. 4B is an end view taken along the line B1-B1 of FIG. 4A.
Figure 5B:
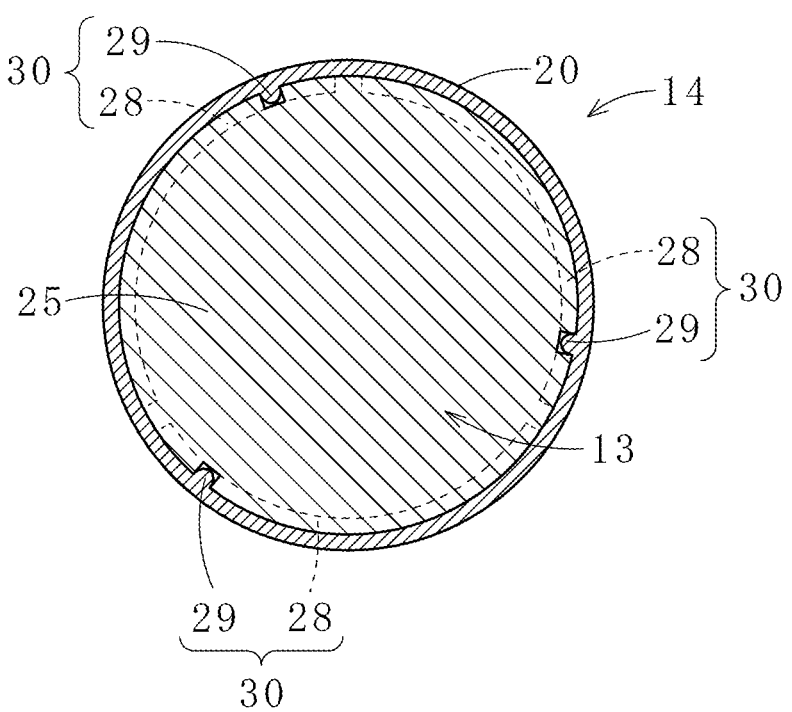
FIG. 5B is a cross-sectional view taken along the line B3-B3 of FIG. 4A.

Here, as described above, the second rotating body 14 is held by the first rotating body 13 so as to be able to rotate in the forward and reverse directions, and at the same time, it can move in the axial direction of the first rotating body 13. As illustrated in FIGS. 1B, 3 and 4B, the first rotating body 13 has a cylindrical first guide portion 24 and a columnar second guide portion 25. The first guide portion 24 is located on one side (here, the left side of each of the drawings) in the axial direction of the main body portion 16 (first rotating body 13) and abuts on the inner circumferential surface of the outer cylindrical portion 20, and the second guide portion 25 is located on the other side (here, the right side of each of the drawings) in the axial direction of the main body portion 16 (first rotating body 13) and abuts on the inner circumferential surface of the outer cylindrical portion 20. Then, as illustrated in FIGS. 2B, 3 and 5B, a guide groove 28 in which a first groove 26 and a second groove 27 are paired is formed at each of the three locations on the outer circumference of the second guide portion 25. The first groove 26 is curved clockwise toward one side of the second guide portion 25 from the other side of the second guide portion 25 when viewed from the other side in the axial direction of the main body portion 16, and the second groove 27 branches from the first groove 26 located on the other side of the second guide portion 25 and is curved counterclockwise toward the one side of the second guide portion 25. In addition, a hemispherical protrusion 29 is formed at each of the three locations on the inner circumferential surface of the outer cylindrical portion 20 corresponding to the position of the other end of each of the guide grooves 28. Each of the guide grooves 28 and each of the protrusions 29 corresponding thereto constitutes a set of guide means 30.

Therefore, the guide groove 28 and the protrusion 29 of each of the three sets of guide means 30 are engaged with each other, and as a result, the second rotating body 14 can be smoothly moved toward one side of the first rotating body 13 while rotating, when the second rotating body 14 (in the initial position) located on the other side of the first rotating body 13 rotates in the forward and reverse directions. For example, assuming that the clockwise rotation as described above is forward rotation, when the second rotating body 14 rotates in the forward direction (clockwise) on the other side of the first rotating body 13, the protrusion 29 of each of the three sets of guide means 30 moves along the first groove 26 of each of the guide grooves 28. As a result, the second rotating body 14 moves toward one side of the first rotating body 13 while rotating. Furthermore, when the second rotating body 14 rotates in the reverse direction (counterclockwise) on the other side of the first rotating body 13, the protrusion 29 of each of the three sets of guide means 30 moves along the second groove 27 of each of the guide groove 28. As a result, the second rotating body 14 moves toward one side of the first rotating body 13 while rotating. That is, the second rotating body 14 located on the other side of the first rotating body 13 can move toward one side of the first rotating body 13 regardless of the rotation direction thereof.

Figure 4A:
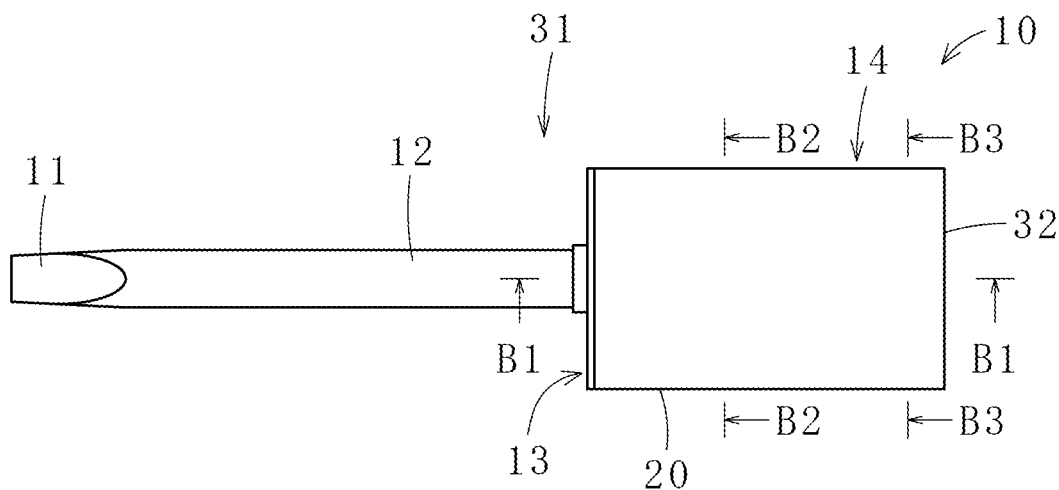
FIG. 4A is a plan view showing a state of use of an assist-attached rotation tool provided with the rotation assist tool.

A case of tightening a minus screw (an example of an object) using an assist-attached rotation tool 31 provided with the rotation assist tool 10 on the base side of the rotary shaft 12 having the output unit 11 similar to a flat-bladed screwdriver on the front side thereof will be described below as illustrated in FIG. 4A. The minus screw is a right-hand screw. When the output unit 11 is pressed against the split (minus type recess) of the head of the minus screw, and the second rotating body 14 is rotated clockwise on the other side of the first rotating body 13, as explained earlier, the second rotating body 14 moves toward one side of the first rotating body 13 while rotating by the action of the guide means 30. At this time, the second rotating body 14 can be rotated with almost no load. Then, when each of the second convex portions 21 comes into contact with the elastically deformable body 22, compression (elastic deformation) of the elastically deformable body 22 starts between the first convex portion 17 and the second convex portion 21. Each of the elastically deformable bodies 22 stores a part of input (rotational) energy while being compressed. When the amount of compression (elastic deformation amount) of the elastically deformable bodies 22 reaches a predetermined amount, the first rotating body 13 and the rotary shaft 12 fixed to the first rotating body 13 are integrated with the second rotating body 14 and start to rotate, and the minus screw can be tightened by the output unit 11. In the process of continuing to rotate the second rotating body 14, compression and restoration of the elastically deformable bodies 22 occur, so that the elastic energy stored in the elastically deformable bodies 22 at the time of compression is converted into rotational energy at the time of restoration. Then the rotation of the rotary shaft 12 is assisted. As a result, the load on the operator can be reduced and the tightening work can be performed smoothly.

Here, as illustrated in FIGS. 1B and 4B, the second rotating body 14 has a closing plate 32 that closes the other side of the outer cylindrical portion 20, and a plate-shaped elastic member 33 made of synthetic rubber or the like is attached to the inner surface of the closing plate 32 (on one side). Then, in the state illustrated in FIG. 4B, when the second rotating body 14 finishes moving from the other side of the first rotating body 13 to one side, and the first rotating body 13 and the second rotating body 14 start to rotate integrally, the elastic member 33 is in contact with an end surface 34 of the other side of the second guide portion 25. Therefore, since the second rotating body 14 can press the first rotating body 13 toward the front side of the rotary shaft 12 with the second guide portion 25 (end surface 34) as a pressed portion, the minus screw can be strongly tightened while being pushed in the axial direction by the output unit 11. The elastic member may be attached to the second guide portion 25 side.

When the second rotating body 14 located on the other side of the first rotating body 13 is rotated in the forward and reverse directions, the guide means 30 move the second rotating body 14 toward one side of the first rotating body 13 while rotating the second rotating body 14. However, when the second rotating body 14 located on one side of the first rotating body 13 is rotated in the forward and reverse directions, the guide means 30 can move the second rotating body 14 toward the other side of the first rotating body 13 while rotating the second rotating body 14. Therefore, in addition to continuing to rotate the second rotating body 14 in the same direction with the second rotating body 14 located on one side of the first rotating body 13, it is also possible to move the second rotating body 14 from one side to the other side of the first rotating body 13 with rotating only the second rotating body 14 during the work, and without rotating the rotary shaft 12 and the first rotating body 13 in the reverse direction. As a result, even if the second rotating body 14 is repeatedly rotated in the forward and reverse directions, the minus screw does not loosen, the elastically deformable bodies 22 can be repeatedly compressed, the elastic energy stored in the elastically deformable bodies 22 is used repeatedly, and the minus screw can be tightened efficiently.

In this embodiment, the guide grooves 28, in which the first and second grooves 26 and 27 formed on the outer circumference of the second guide portion 25 are paired, and the protrusion 29 formed on the inner circumferential surface of the outer cylindrical portion 20 are used as a set of guide means 30, but guide grooves may be formed on the inner circumferential surface side of the outer cylindrical portion, and protrusions may be formed on the second guide portion side. Moreover, the shape of a protrusion is not limited to a hemispherical shape, and may be formed in a columnar shape, or a rotator that rotates when a protrusion moves along a guide groove may be attached to the tip of the protrusion. In addition, the number and arrangement of the guide means can be appropriately selected. Further, instead of providing the guide means only on the second guide portion side, the guide means may be provided only on the first guide portion side, or may be provided on both the first guide portion side and the second guide portion side.

The operation when tightening the minus screw has been described above, but even if a plus screw having a plus-shaped depression, a screw having one of the depressions of various shapes such as a hexagon or a star, a screw in which the outer shape of the head in a plane view is formed into a polygonal shape such as a quadrangle or a hexagon or the like is used, the tightening operation can be performed with the assist-attached rotation tool by selecting the shape of the output unit according to the shape of the screw. In addition, the assist-attached rotation tool can be used not only for tightening these screws but also for loosening them. The operation when loosening these screws by using the assist-attached rotation tool is basically only to reverse (counterclockwise) the rotation direction of the second rotating body 14. First, when the second rotating body 14 is rotated counterclockwise on the other side of the first rotating body 13, the second rotating body 14 moves toward one side of the rotating body 13 while being rotated by the action of the guide means 30, as described above. Usually, when loosening a screw, a large force is required first, but the second rotating body 14 can be rotated with almost no load until the second convex portions 21 come into contact with the elastically deformable bodies 22. Then, when the second rotating body 14 is further rotated and the second convex portions 21 come into contact with the elastically deformable bodies 22, the compression (elastic deformation) of the elastically deformable body 22 starts between the first convex portion 17 and the second convex portion 21.

Therefore, even when the screw is loosened, the elastically deformable bodies 22 can be elastically deformed with a small force while reducing the load at the time of initial movement, and a part of the input (rotational) energy can be accumulated while each of the elastically deformable bodies 22 is compressed. When the amount of compression (elastic deformation amount) of the elastically deformable bodies 22 reaches a predetermined amount, the first rotating body 13 and the rotary shaft 12 fixed to the first rotating body 13 start to rotate integrally with the second rotating body 14 and the screw can be loosened by the output unit 11. In the process of continuing to rotate the second rotating body 14, compression and restoration of the elastically deformable bodies 22 occur, so that the elastic energy accumulated in the elastically deformable bodies 22 at the time of compression is converted into rotational energy at the time of restoration and the rotation of the rotary shaft 12 is assisted. Therefore, the operator can efficiently loosen the screw with a small force. At this time, if the screw is hard, the elastic energy accumulated in the elastically deformable bodies 22 becomes large, and the rotational energy generated when the compressed elastically deformable bodies 22 are restored also becomes large, so that the screw can be easily and surely loosened without increasing the load on the operator.

Incidentally, it is also possible to rotate the second rotating body by providing a drive means connecting portion on the second rotating body and connecting a rotation drive means such as an electric motor to the drive means connecting portion instead of manually rotating the second rotating body. Moreover, the rotation assist tool 10 can be attached to the base side of a rotary shaft having an input unit on the front side thereof instead of the rotary shaft 12 having the output unit 11 on the front side thereof. In that case, the first rotating body can be rotated together with the rotary shaft by the rotational energy input from the input unit, and the rotation can be transmitted to the second rotating body via the elastically deformable bodies. Therefore, for example, if a blade or the like is attached to the outer circumference of the second rotating body as the output unit and an electric motor or the like is connected to the input unit, the assist-attached rotation tool can be used as a propeller, a screw or the like. Furthermore, if a handle is attached as the input unit and the second rotating body (outer cylindrical portion) itself is used as a spool, or a spool is attached to the second rotating body, the fishing line can be wound around the spool by rotating the rotary shaft with the handle, and it can also be used as a reel for fishing. Further, if the same configuration is enlarged and electrified, it can be applied to a winch or the like.

Next, with reference to FIGS. 6 to 10, a rotation assist tool 36 and an assist-attached rotation tool 37 provided with the rotation assist tool 36 according to a second embodiment of the present invention will be described. The same components as those in the first embodiment are designated by the same reference signs as those in the first embodiment, and the description thereof will be omitted.

Figure 6A:
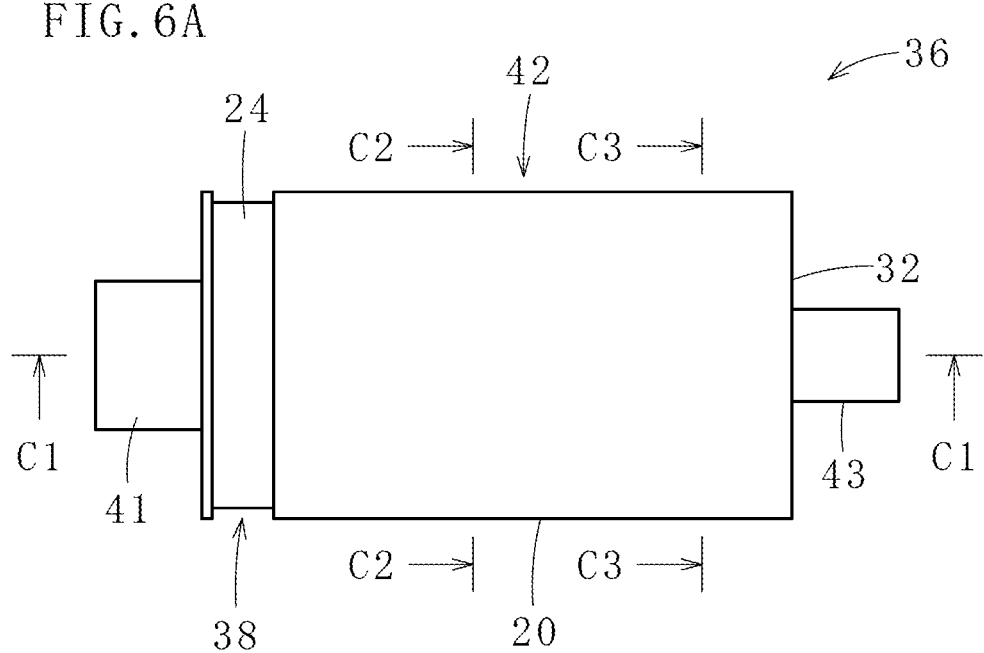
FIG. 6A is a plan view of a rotation assist tool according to a second embodiment of the present invention.
Figure 6B:
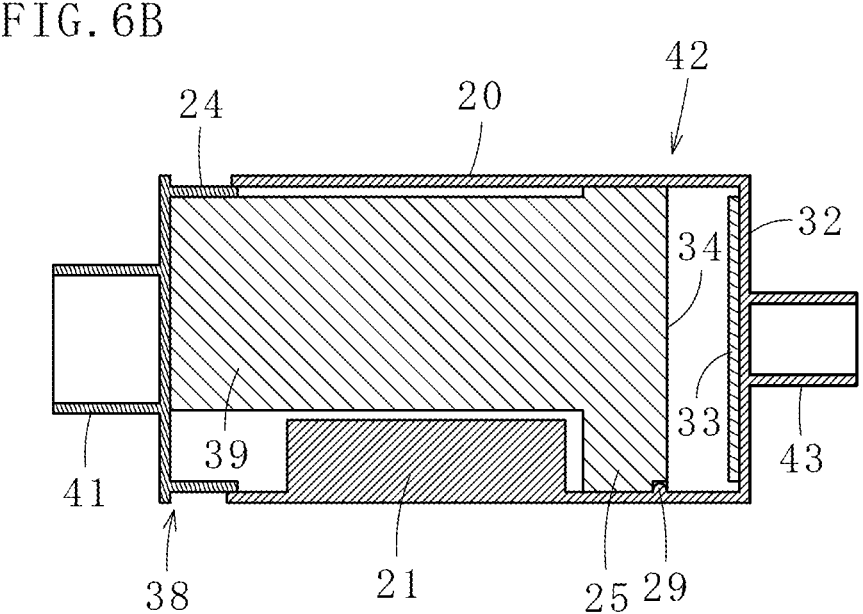
FIG. 6B is an end view taken along the line C1-C1 of FIG. 6A.
Figure 7A:
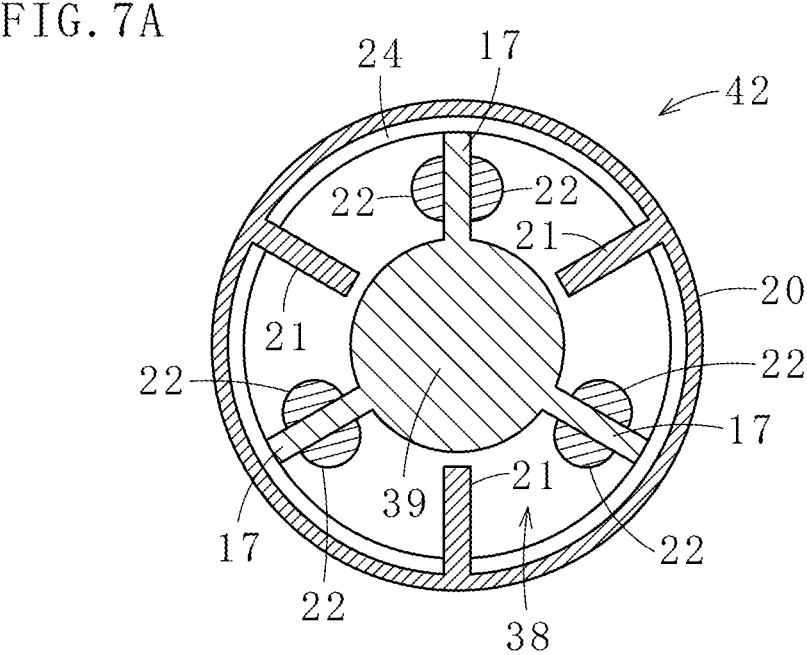
FIG. 7A is a cross-sectional view taken along the line C2-C2 of FIG. 6A.
Figure 7B:
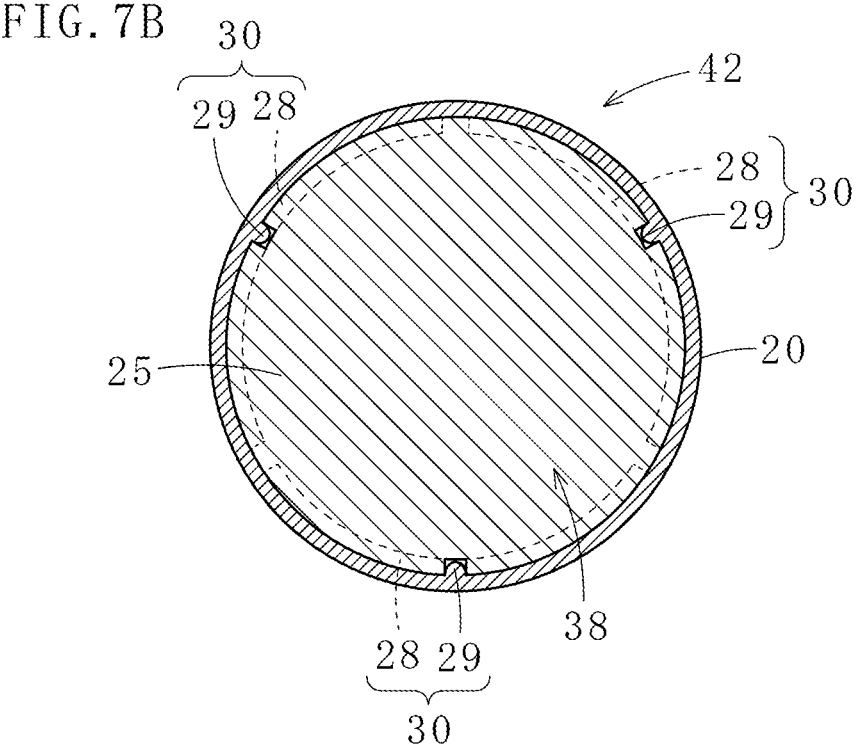
FIG. 7B is a cross-sectional view taken along the line C3-C3 of FIG. 6A.
Figure 8:
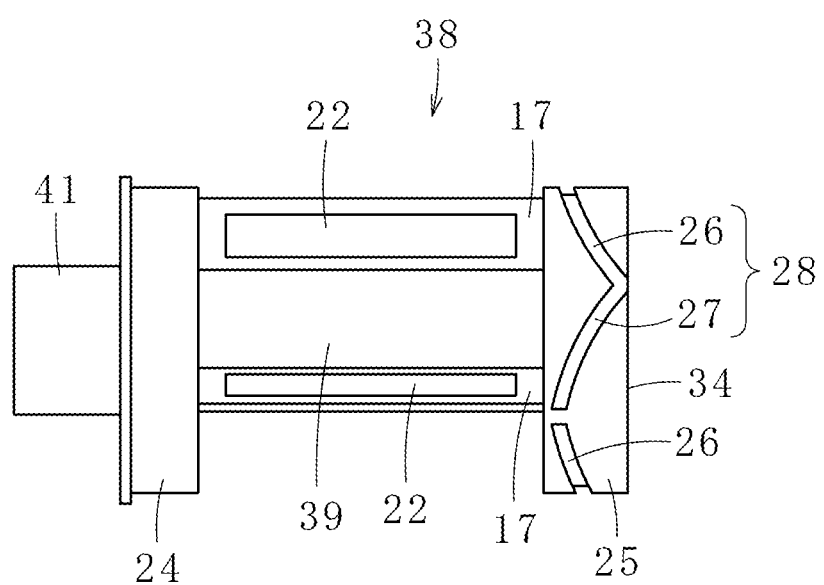
FIG. 8 is a side view showing a first rotating body of the rotation assist tool.
Figure 9A:
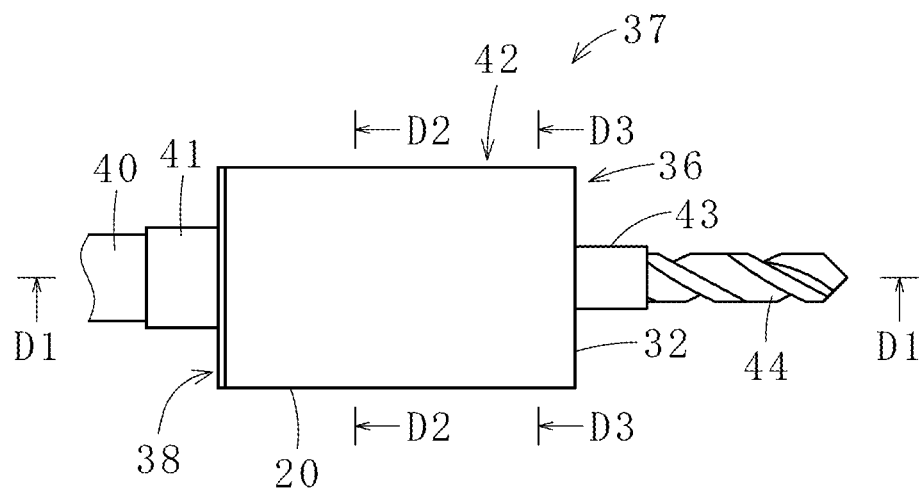
FIG. 9A is a plan view showing a state of use of an assist-attached rotation tool provided with the rotation assist tool.
Figure 9B:
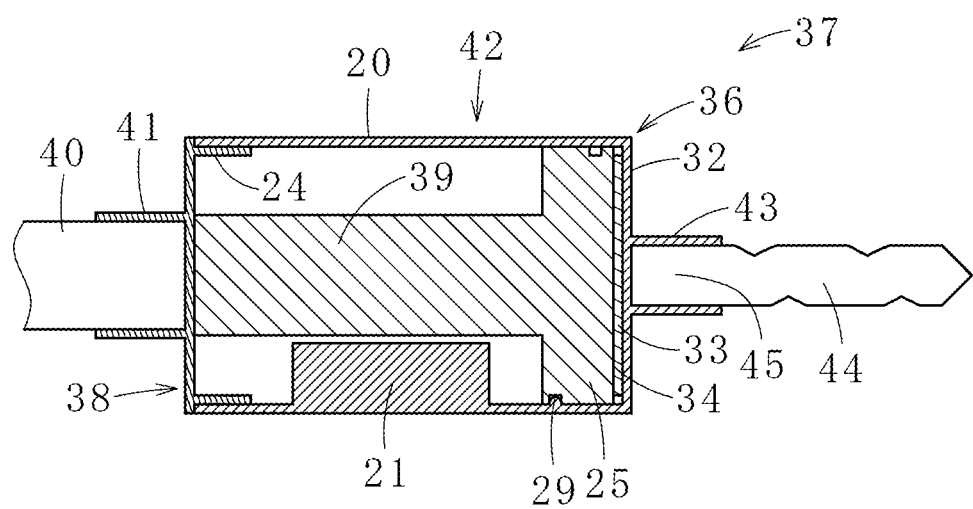
FIG. 9B is an end view taken along the line D1-D1 of FIG. 9A.
Figure 10A:
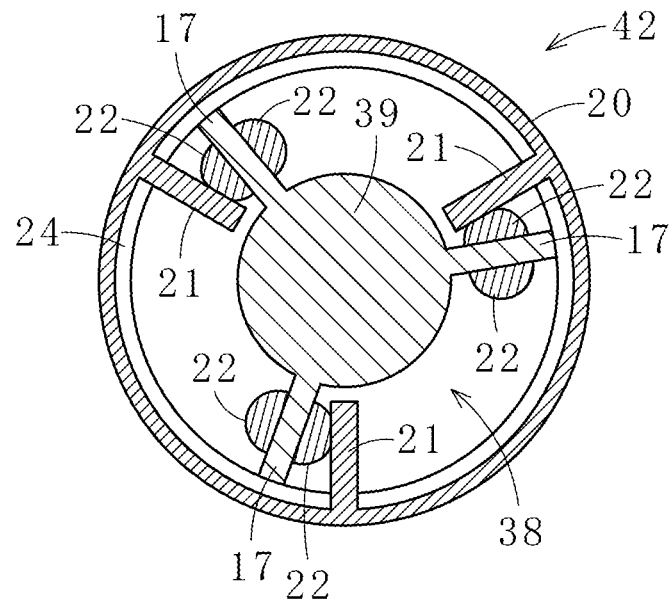
FIG. 10A is a cross-sectional view taken along the line D2-D2 of FIG. 9A.
Figure 10B:
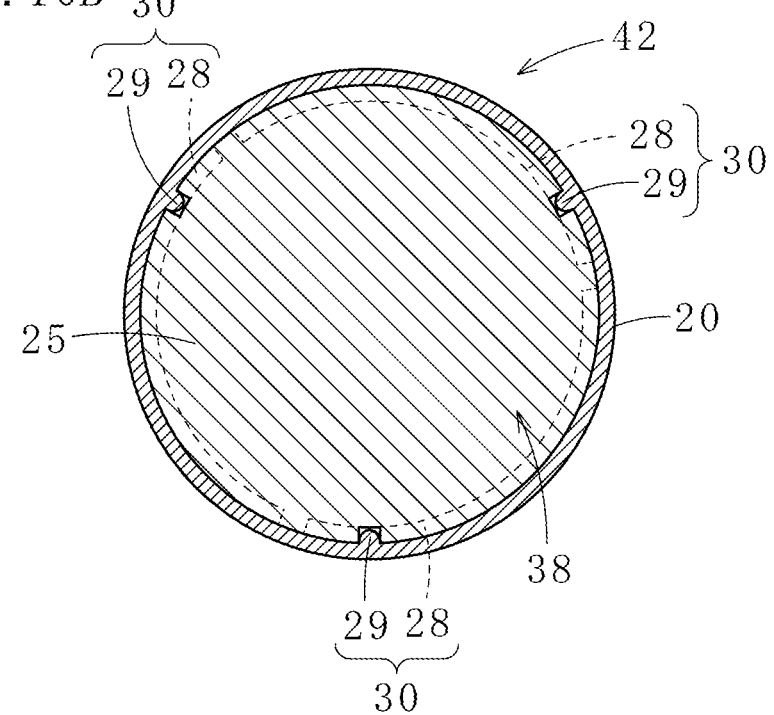
FIG. 10B is a cross-sectional view taken along the line D3-D3 of FIG. 9A.

The difference in the configuration of the rotation assist tool 10 and the rotation assist tool 36 is that in the rotation assist tool 10, the rotary shaft mounting portion 15 is formed on the main body portion 16 of the first rotating body 13, whereas in the rotation assist tool 36, as illustrated in FIGS. 6A, 6B, 8, 9A and 9B, a drive means connecting portion 41, to which a drive shaft 40 (see FIG. 9) of a rotation drive means (not illustrated) such as an electric motor is connected, is formed on one side of a main body portion 39 of a first rotating body 38, and as illustrated in FIGS. 6 and 9, the outer cylindrical portion 20 is formed on one side of a second rotating body 42 and a rotary shaft mounting portion 43 is formed on the other side (outside of the closing plate 32) of the second rotating body 42.

As illustrated in FIG. 9, in the assist-attached rotation tool 37, the base side of a rotary shaft 45 having a drill-shaped output unit 44 on the front side thereof is fixed to the rotary shaft mounting portion 43 of the rotation assist tool 36. However, the shape of the output unit can be appropriately selected.

Further, the difference between the operation of the rotation assist tool 10 and the assist-attached rotation tool 31 and the operation of the rotation assist tool 36 and the assist-attached rotation tool 37 is that in the rotation assist tool 10 and the assist-attached rotation tool 31, the rotation of the second rotating body 14 is transmitted to the first rotating body 13 via the elastically deformable bodies 22, whereas in the rotation assist tool 36 and the assist-attached rotation tool 37, as illustrated in FIGS. 7A, 7B, 10A and 10B, the rotation of the first rotating body 38 is transmitted to the second rotating body 42 via the elastically deformable bodies 22. Therefore, the guide means 30 act to move the first rotating body 38 toward the other side of the second rotating body 42 while rotating the first rotating body 38 when the first rotating body 38 located on one side of the second rotating body 42 rotates in the forward and reverse directions. Additionally, when the first rotating body 38 moves to the other side of the second rotating body 42, the closing plate 32 (the elastic member 33) on the other side of the second rotating body 42 becomes a pressed portion that is pressed toward the tip side of the rotary shaft 45 by the first rotating body 38. At this time, an elastic member may be attached to the other side of the second guide portion of the first rotating body.

The above difference is only in the transmission path of rotation, and there is no difference in the obtained action and effect. Furthermore, in the present embodiment, the first rotating body 38 is rotated by the rotation drive means, but it is also possible to manually rotate the first rotating body by providing a grip portion (handle) instead of the drive means connecting portion on one side of the first rotating body.

When the assist-attached rotation tool 37 is used, the tip of the output unit 44 is pressed against the object to be machined, so that the second rotating body 42 becomes in a fixed state (the object to be machined acts as a resistance and the rotation is hindered). Therefore, the first rotating body 38 can be rotated relative to the second rotating body 42 to deform (compress) the elastically deformable bodies 22.

Next, with reference to FIGS. 11 to 15, a rotation assist tool 46 and an assist-attached rotation tool 47 provided with the rotation assist tool 46 according to a third embodiment of the present invention will be described. The same components as those in the first and second embodiments are designated by the same reference signs as those in the first and second embodiments, and the description thereof will be omitted.

In the assist-attached rotation tool 47 provided with the rotation assist tool 46 illustrated in FIGS. 11 to 15, the rotation assist tool 46 is attached to the base side of a rotary shift 49 having a stirring blade-shaped output unit 48 on the front side thereof as illustrated in FIGS. 11A, 11B, 14A and 14B.

In the rotation assist tool 46, as illustrated in FIGS. 11, 12, 14 and 15, a first rotating body 50 has a main body portion 51 to which the base side of the rotary shift 49 is fixed. In this embodiment, as illustrated in FIGS. 12A, 12B, 15A, and 15B, an anti-rotation protrusion 53 is formed at each of the two locations on the outer circumference of the large diameter portion 52 on the base side of the rotary shaft 49, and a rotary shaft mounting portion 54 is formed at the axial center of the main body portion 51 in accordance with the shapes of the large diameter portion 52 and the anti-rotation protrusions 53. However, the shape of the base side of the rotary shaft 49 can be appropriately selected, and the shape of the rotary shaft mounting portion can also be appropriately selected according to the shape of the base side of the rotary shaft 49. Furthermore, the main body portion only needs to be able to fix the base side of the rotary shaft, and the fixing method can be appropriately selected.

As illustrated in FIGS. 11B, 12, 14B, and 15, a plurality of arc-shaped space portions 56 (here, each is formed at each of the four locations) that each penetrates the main body portion 51 in the axial direction and is curved concentrically around the axis of the main body portion 51 is formed in the main body portion 51. Then, as illustrated in FIGS. 12 and 15, each elastically deformable body 57 is housed along the axial direction of the main body portion 51 on one side and the other side in the circumferential direction of each space portion 56. As the material of elastically deformable body 57, the same material as that of elastically deformable body 22 is preferably used.

In addition, as illustrated in FIGS. 11 to 15, the second rotating body 59 in the rotation assist tool 46 includes a rotating plate 60 on one side and a rotating plate 61 on the other side, and a plurality of connecting shafts 62. The rotating plates 60, 61 are arranged to face each other on both sides in the axial direction of the main body portion 51, respectively. Each of the connecting shafts 62 passes between the elastically deformable bodies 57 accommodated on one side and the other side in the circumferential direction of each space portion 56 and penetrates the space portion 56, and connects the rotating plate 60 on one side and the rotating plate 61 on the other side. Then, the base side (large diameter portion 52) of the rotary shaft 49 penetrates the rotating plate 60 on one side and is fixed to the main body portion 51, and the second rotating body 59 can rotate in forward and reverse directions with respect to the rotary shaft 49 and the first rotating body 50.

In this embodiment, in order to facilitate deformation when each elastically deformable body 57 is pressed by the connecting shaft 62, a small protrusion 64 is formed on a side portion of each elastically deformable body 57 on the connecting shaft 62 side (contact portion pressed by the connecting shaft 62). The shape of the small protrusion can be appropriately selected, and may be formed so as to form continuous ridges along the longitudinal direction of each elastically deformable body 57, or may be formed intermittently (divided into a plurality of parts). In particular, when the small protrusion is formed intermittently, the shape is preferably hemispherical, conical or truncated conical (frustum of cone), but is not limited thereto. In addition, such a small protrusion can also be formed on the connecting shaft side. By forming the small protrusion on the connecting shaft side, the force at the time of pressing is concentrated on the tip of the small protrusion, and the elastically deformable body can be efficiently compressed. Further, the small protrusion may be omitted depending on the elasticity (hardness) of the elastically deformable body. When the small protrusion is not provided, the elastically deformable body is preferably formed in a columnar shape, but is not limited to this.

Figure 11A:
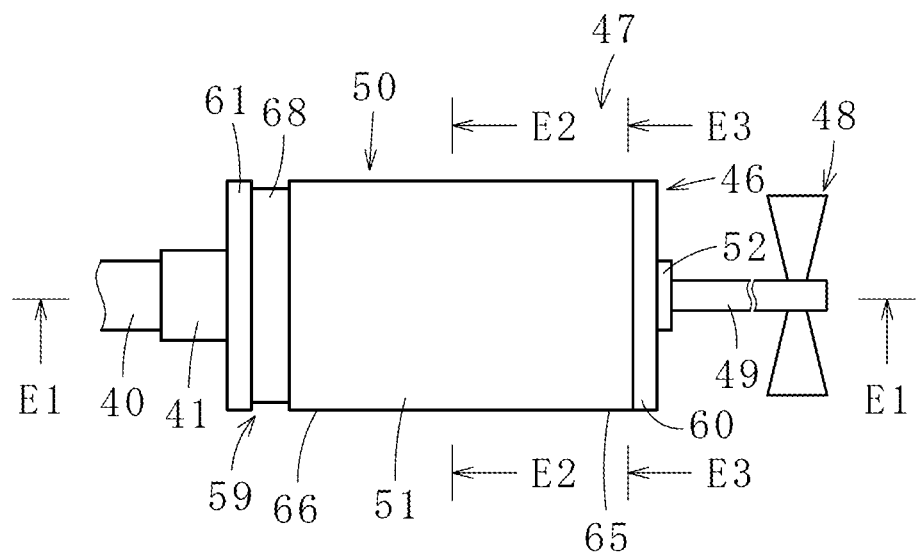
FIG. 11A is a plan view of an assist-attached rotation tool provided with a rotation assist tool according to a third embodiment of the present invention.
Figure 11B:
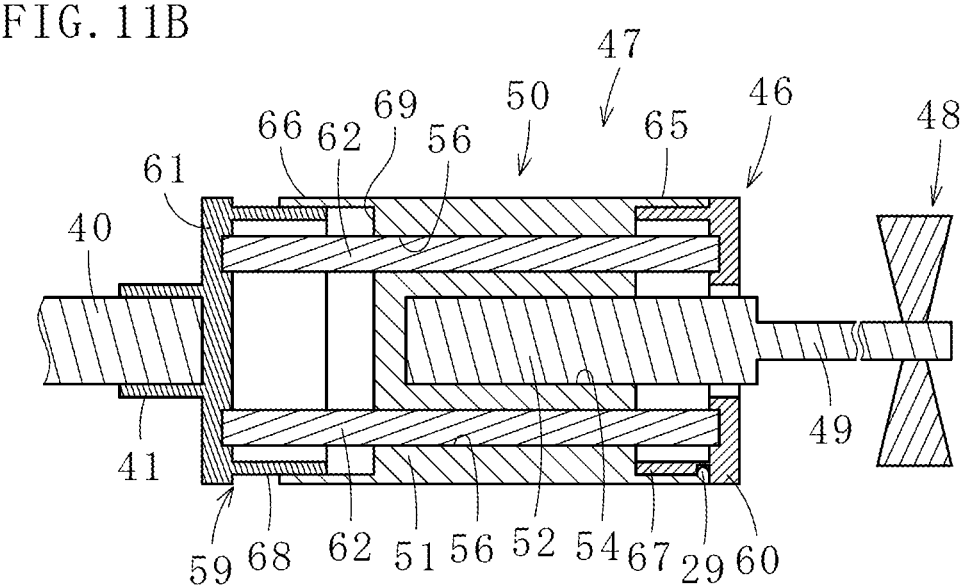
FIG. 11B is an end view taken along the line E1-E1 of FIG. 11A.
Figure 12A:
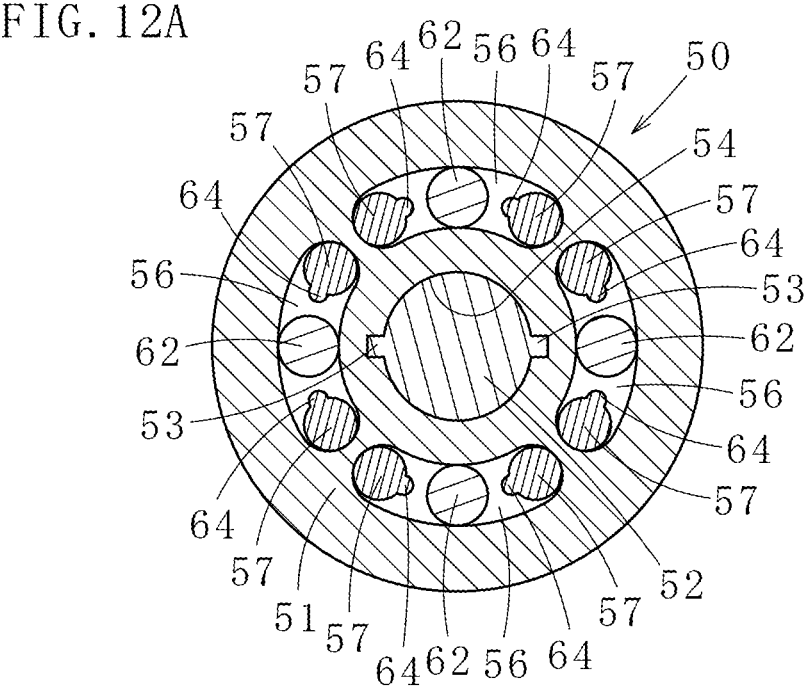
FIG. 12A is a cross-sectional view taken along the line E2-E2 of FIG. 11A.
Figure 12B:
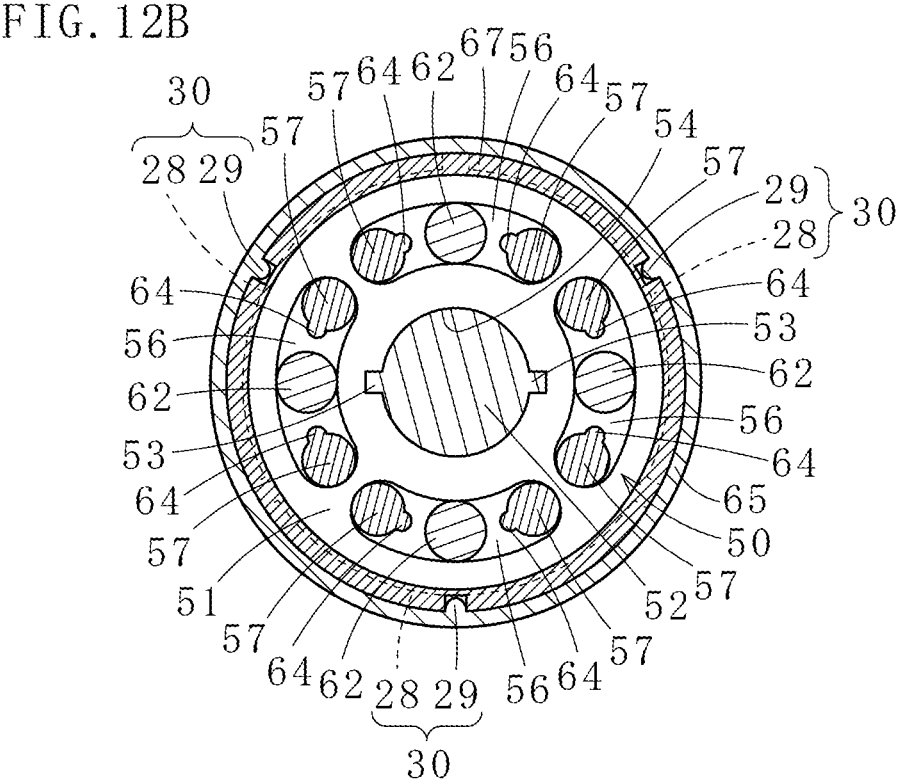
FIG. 12B is a cross-sectional view taken along the line E3-E3 of FIG. 11A.
Figure 13:
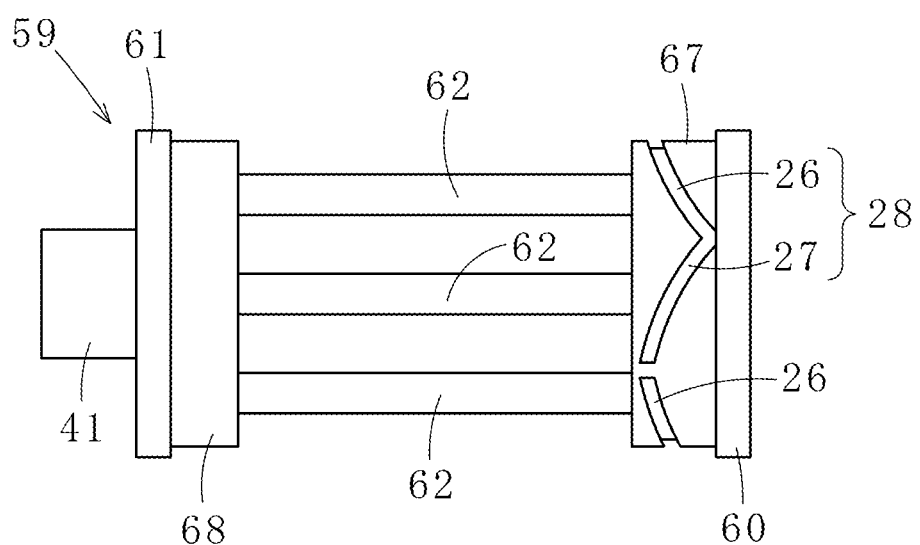
FIG. 13 is a side view showing a second rotating body provided in the rotation assist tool of the assist-attached rotation tool.
Figure 14A:
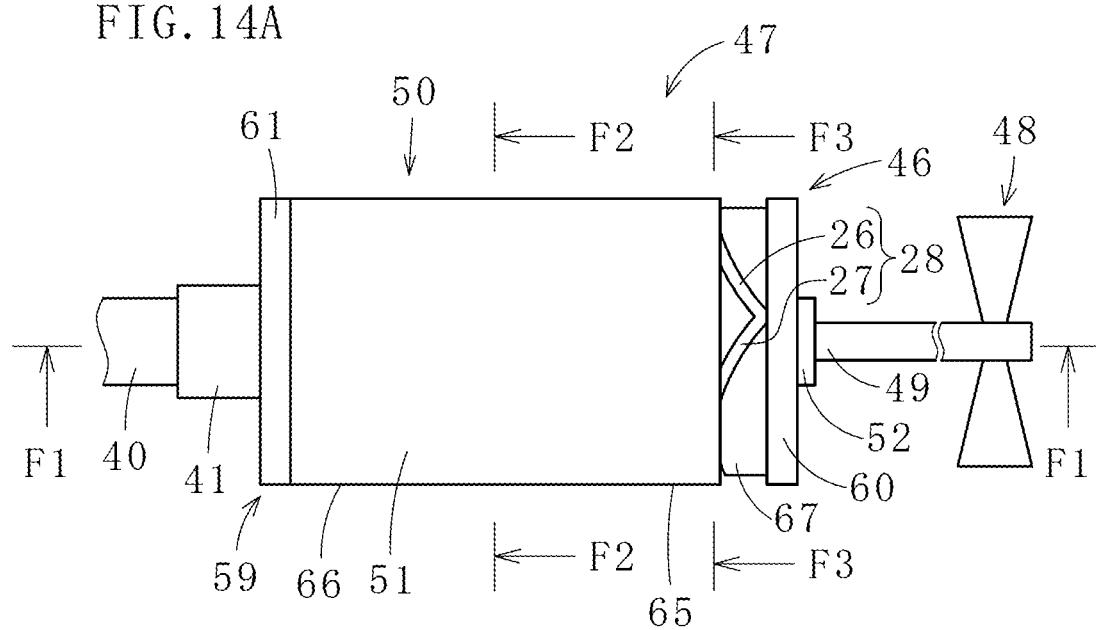
FIG. 14A is a plan view showing a state of use of the assist-attached rotation tool.
Figure 14B:
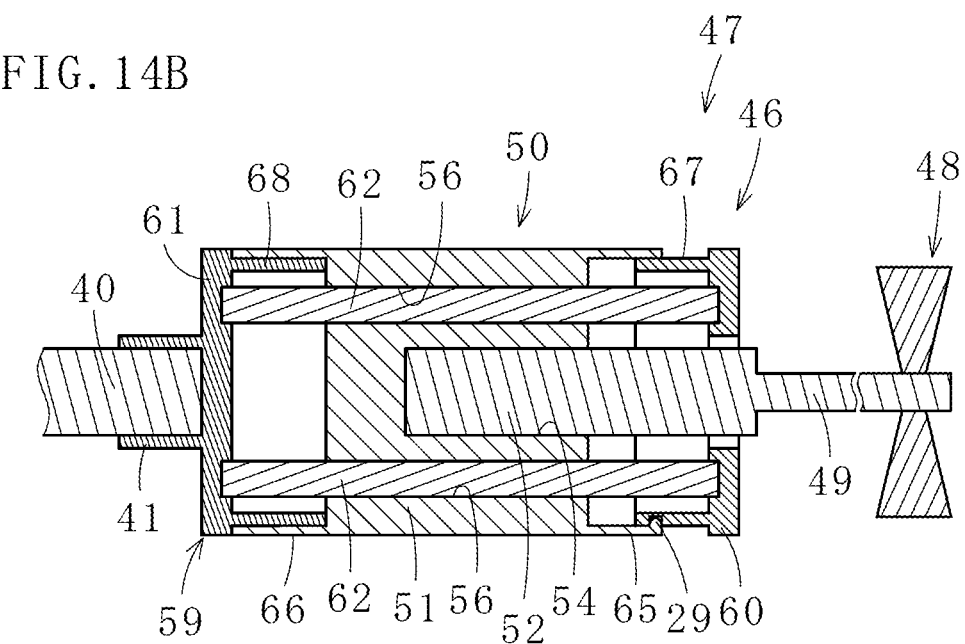
FIG. 14B is an end view taken along the line F1-F1 of FIG. 14A.
Figure 15A:
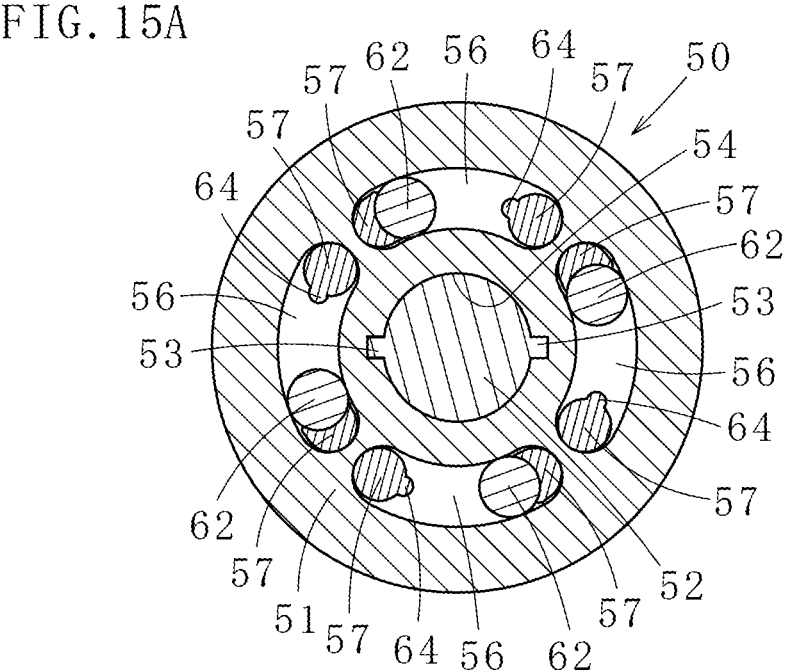
FIG. 15A is a cross-sectional view taken along the line F2-F2 of FIG. 14A.
Figure 15B:
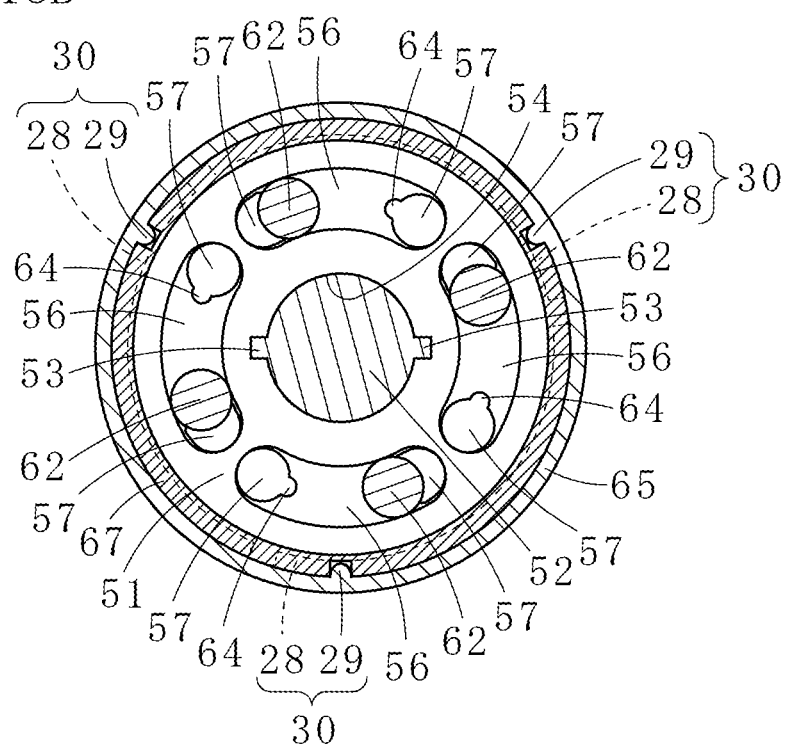
FIG. 15B is a cross-sectional view taken along the line F3-F3 of FIG. 14A.

Moreover, as illustrated in FIGS. 11B and 14B, a first cylindrical portion 65 and a second cylindrical portion 66 are formed on one side and the other side in the axial direction of the main body portion 51 of the first rotating body 50, respectively, and as illustrated in FIGS. 11, 12B, 13, 14, and 15B, cylindrical first and second guide portions 67 and 68 that abut on the inner circumferential surfaces of the first and second cylindrical portions 65 and 66 are formed inside of the rotating plates 60 and 61 on one side and the other side of the second rotating body 59, respectively. Then, as illustrated in FIGS. 12B, 13 and 15B, similar to the first embodiment, the guide groove 28 in which the first groove 26 and the second groove 27 are paired is formed at each of the three locations on the outer circumference of the first guide portion 67, and the hemispherical protrusion 29 is formed at each of the three locations on the inner circumferential surface of the first cylindrical portion 65 corresponding to the position of the other end of each of the guide grooves 28. Each of the guide grooves 28 and each of the protrusions 29 corresponding thereto constitutes a set of guide means 30. As a result, the second rotating body 59 can move smoothly toward one side of the first rotating body 50 while rotating, when the second rotating body 59 located on the other side of the first rotating body 50 (at the initial position) is rotated in the forward and reverse directions. At this time, the end surface 69 on the other side of the first rotating body 50 (main body portion 51) becomes a pressed portion.

In the rotation assist tool 46, as illustrated in FIGS. 11, 13, and 14, a drive means connecting portion 41, to which a drive shaft 40 of a rotation drive means (not illustrated) such as an electric motor is connected, is formed on the other side of the second rotating body 59 (here, the left side of each of the drawings and the outside of the rotating plate 61 on the other side).

With the above configuration, as illustrated in FIGS. 12 and 15, in the rotation assist tool 46, when the first rotating body 50 and the second rotating body 59 rotate relative to each other, each of the connecting shafts 62 can reliably elastically deform the elastically deformable body 57 and rotation can be transmitted between the first rotating body 50 and the second rotating body 59. Therefore, a liquid (viscous fluid), a fluid, or the like can be agitated by the assist-attached rotation tool 47. In this case, the output unit 48 receives resistance due to the influence of the viscosity of the object to be agitated, etc. and the rotation of the first rotating body 50 is hindered. As a result, the elastically deformable bodies 57 can be deformed (compressed) by rotating the second rotating body 59 relative to the first rotating body 50.

The assist-attached rotation tool can be used for various purposes by changing the shape of the output unit.

Next, with reference to FIGS. 16A, 16B, 17A, 17B, 18, 19A, 19B, 20A and 20B, a rotation assist tool 70 and an assist-attached rotation tool 71 provided with the rotation assist tool 70 according to a fourth embodiment of the present invention will be described. The same components as those in the first to third embodiments are designated by the same reference signs as those in the first to third embodiments, and the description thereof will be omitted.

Figure 16A:
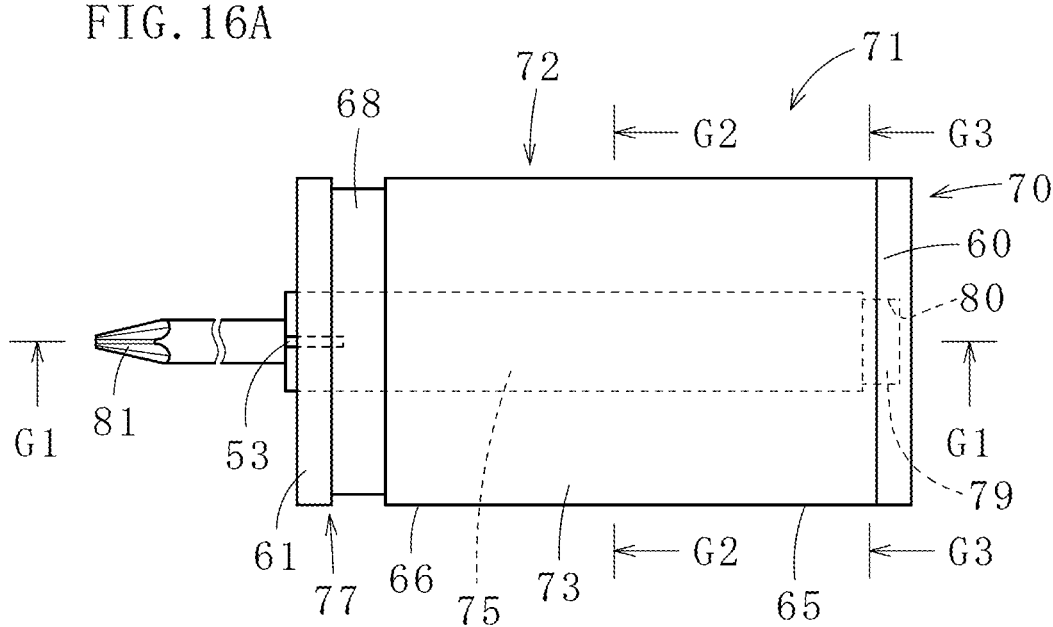
FIG. 16A is a plan view of an assist-attached rotation tool provided with a rotation assist tool according to a fourth embodiment of the present invention.
Figure 16B:
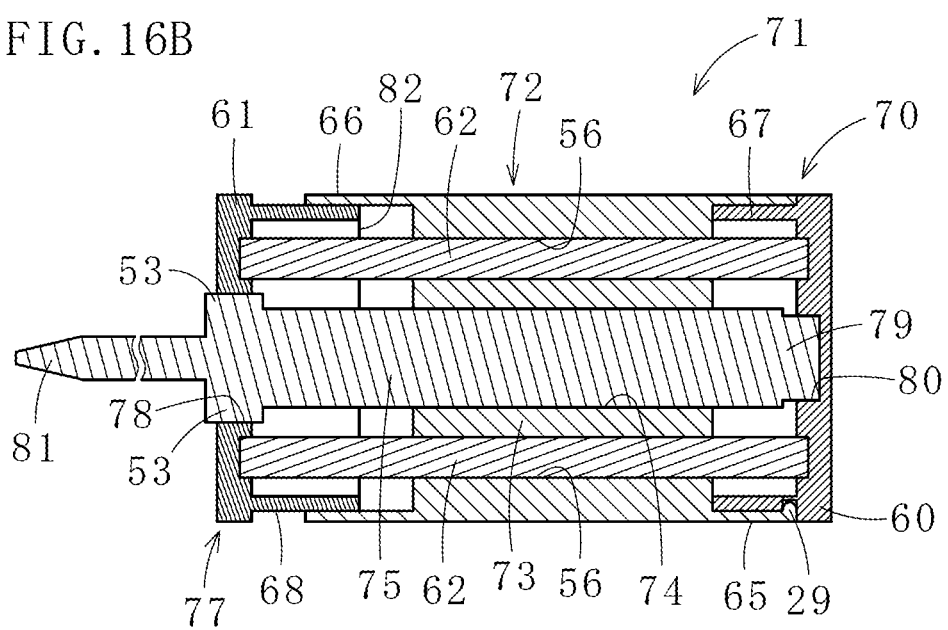
FIG. 16B is an end view taken along the line G1-G1 of FIG. 16A.
Figure 17A:
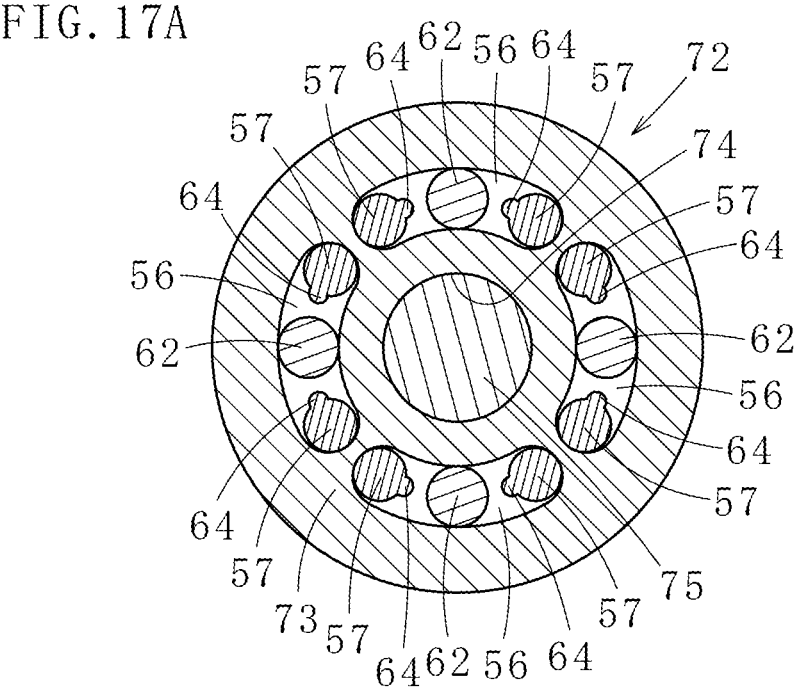
FIG. 17A is a cross-sectional view taken along the line G2-G2 of FIG. 16A.
Figure 17B:
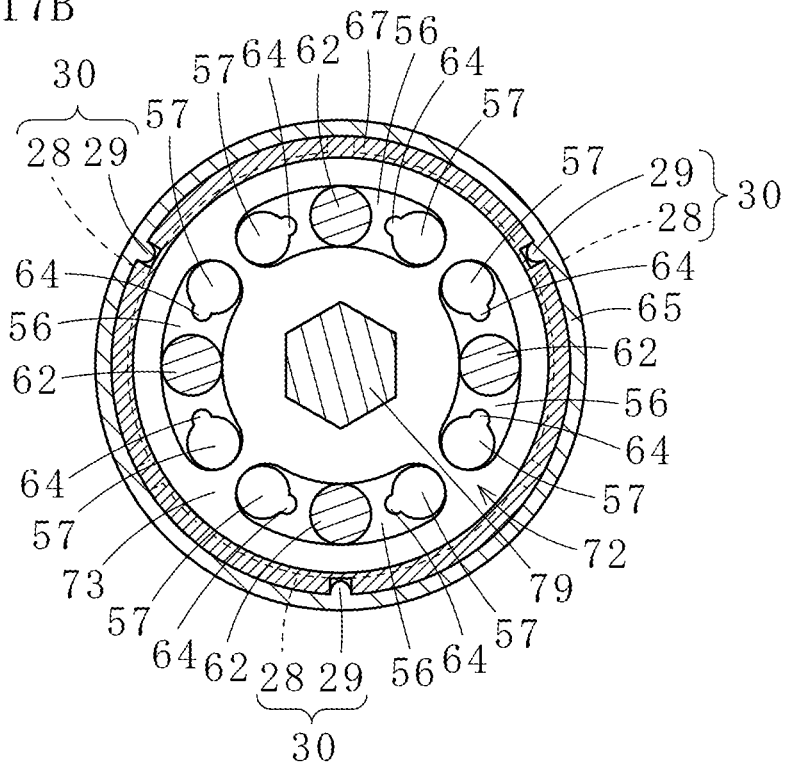
FIG. 17B is a cross-sectional view taken along the line G3-G3 of FIG. 16A.
Figure 18:
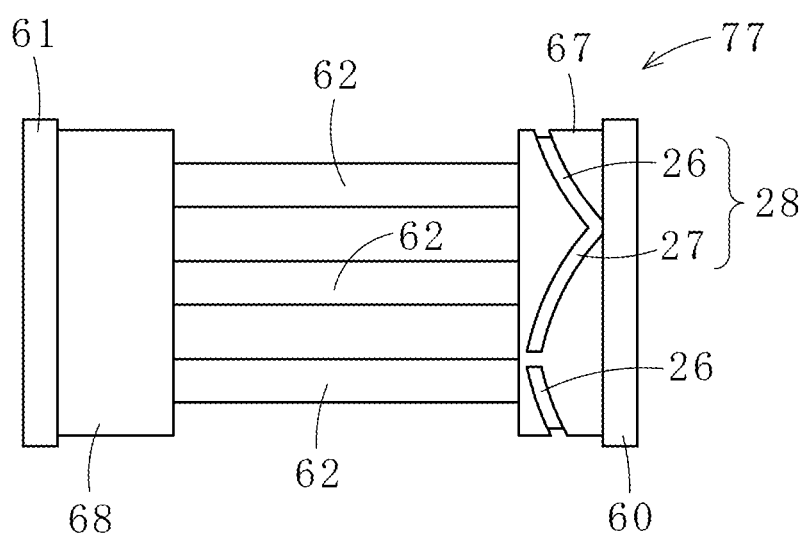
FIG. 18 is a side view showing a second rotating body provided in the rotation assist tool of the assist-attached rotation tool.
Figure 19A:
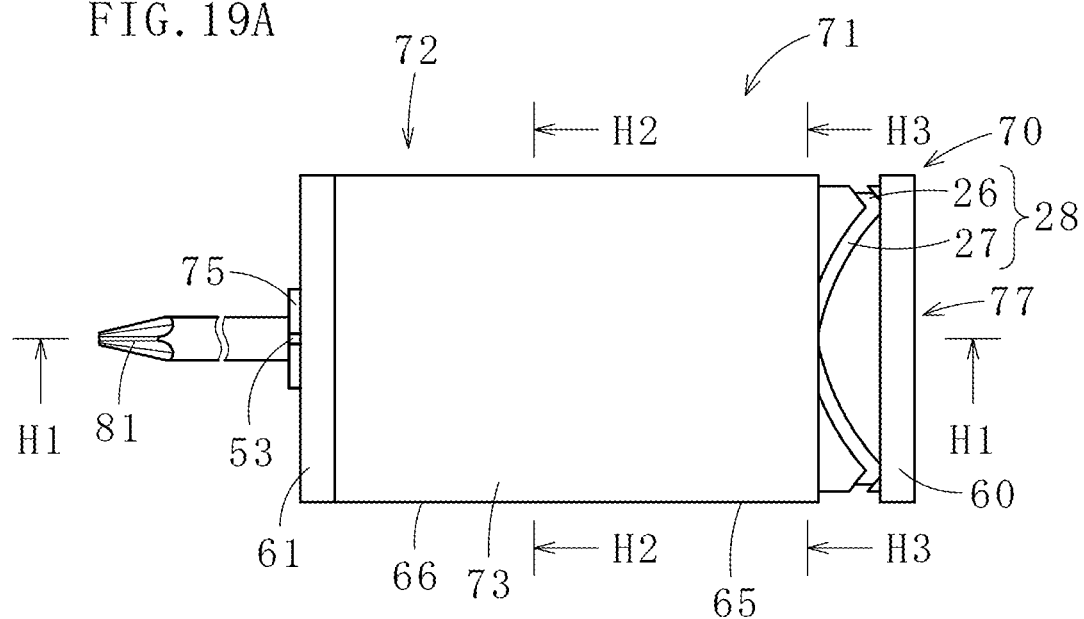
FIG. 19A is a plan view showing a state of use of the assist-attached rotation tool.
Figure 19B:
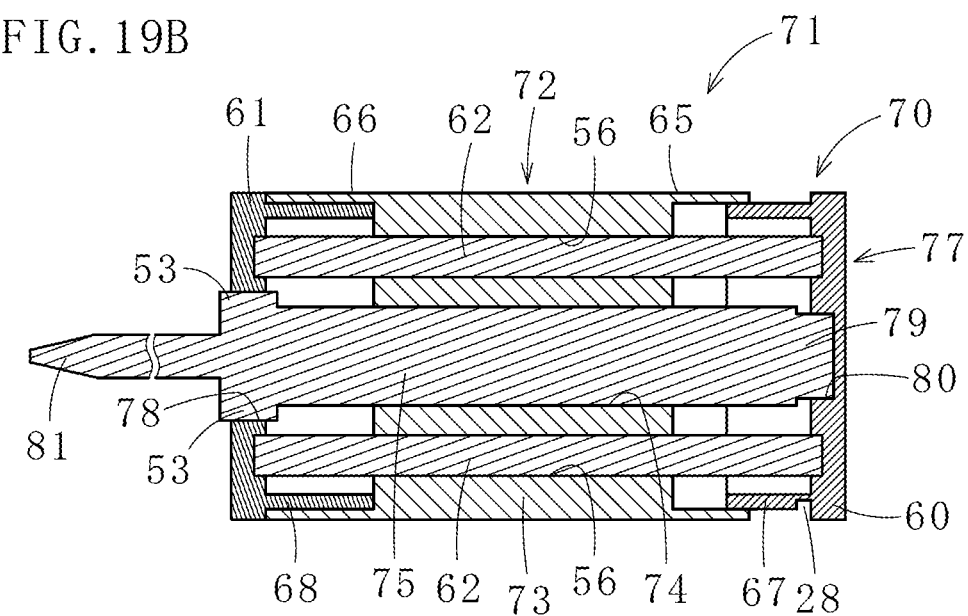
FIG. 19B is an end view taken along the line H1-H1 of FIG. 19A.
Figure 20A:
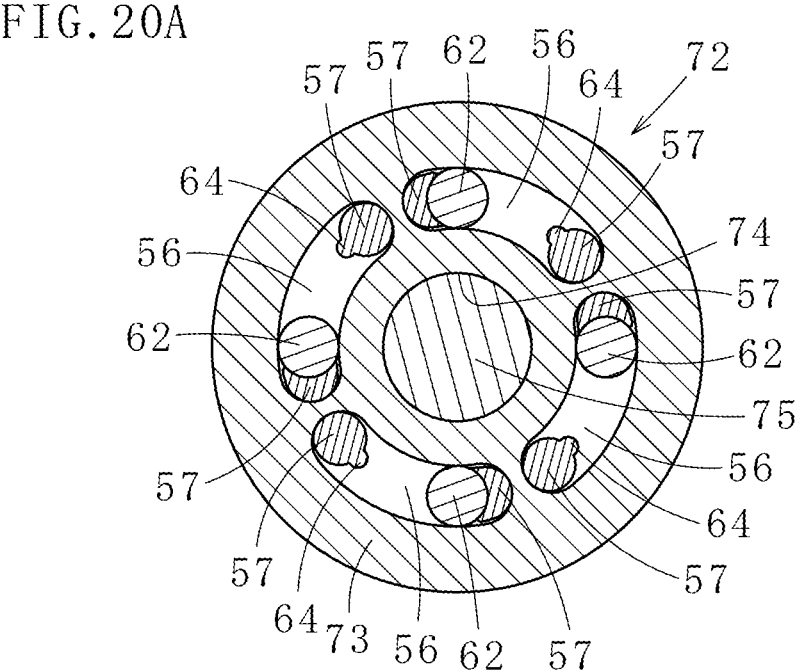
FIG. 20A is a cross-sectional view taken along the line H2-H2 of FIG. 19A.
Figure 20B:
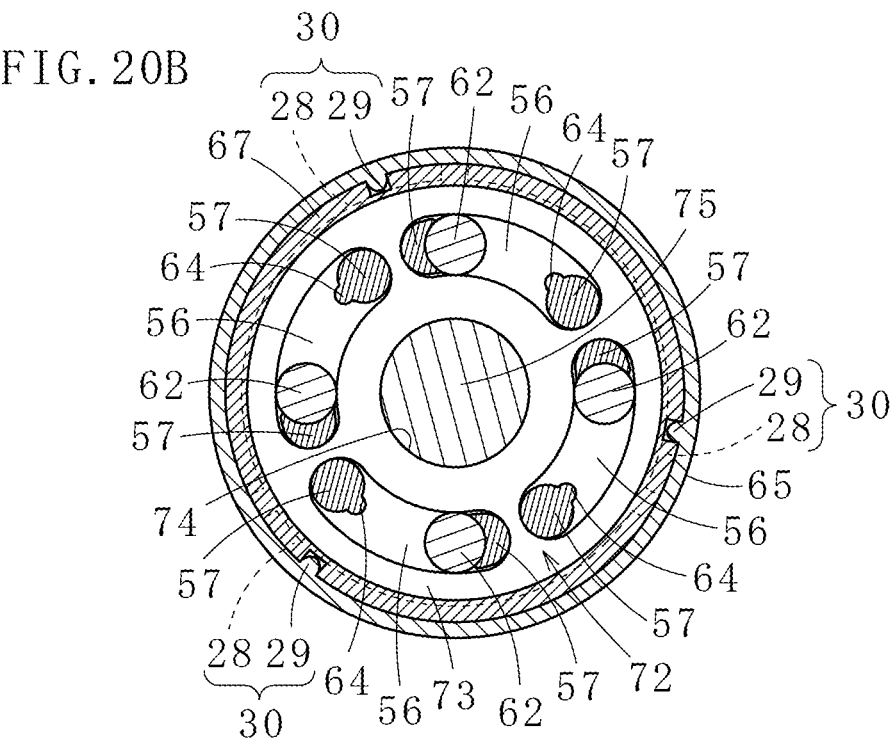
FIG. 20B is a cross-sectional view taken along the line H3-H3 of FIG. 19A.

The difference in the configuration of the rotation assist tool 46 and the rotation assist tool 70 is that in the rotation assist tool 46, the rotary shaft mounting portion 54 is formed on the main body portion 51 of the first rotating body 50, and the main body portion 51 (the first rotating body 50) and the rotary shaft 49 are fixed, whereas in the rotation assist tool 70, as illustrated in FIGS. 16B, 17A, and 19B, a rotary shaft insertion hole 74 is formed in a main body portion 73 of a first rotating body 72 and the main body portion 73 is externally inserted on the base side of a rotary shaft 75 and held on the rotary shaft 75 so as to be rotatable in forward and reverse directions, and the rotating plates 60 and 61 on one side and the other side of a second rotating body 77 are fixed to the rotary shaft 75.

In this embodiment, as illustrated in FIGS. 16 and 19, the anti-rotation protrusion 53 is formed at each of the two locations on the outer circumference of the other side in the axial direction of the rotary shaft 75 (here, the left side of each of the drawings and the front side of the rotary shaft 75). Then, a rotary shaft mounting portion 78 is formed at the axis of the rotating plate 61 on the other side according to the shapes of the rotary shaft 75 and the anti-rotation protrusions 53. Further, as illustrated in FIGS. 16, 17A and 19B, a hexagonal columnar fitting joint protrusion 79 is formed on one side in the axial direction of the rotary shaft 75 (here, the right side of each of the drawings and the base side of the rotary shaft 75), and a rotary shaft fitting portion 80 is formed at the axis of the rotating plate 60 on one side according to the shape of the fitting protrusion 79.

As a result, the rotary shaft 75 can be reliably fixed to the second rotating body 77 (the rotating plates 60, 61 on one side and the other side), but the fixing method can be appropriately selected.

As illustrated in FIGS. 16 and 19, the assist-attached rotation tool 71 has a Phillips head screwdriver-shaped output unit 81 on the tip side of the rotary shaft 75, and the shape of the output unit can be appropriately selected.

Furthermore, the difference between the operation of the rotation assist tool 70 and the assist-attached rotation tool 71 and the operation of the rotation assist tool 46 and the assist-attached rotation tool 47 is that in the rotation assist tool 46 and the assist-attached rotation tool 47, the rotation of the second rotating body 59 is transmitted to the first rotating body 50 via the elastically deformable bodies 57, whereas in the rotation assist tool 70 and the assist-attached rotation tool 71, as illustrated in FIGS. 17 and 20, the rotation of the first rotating body 72 is transmitted to the second rotating body 77 via the elastically deformable bodies 57. At this time, an end surface 82 on one side of the second guide portion 68 of the second rotating body 77 becomes a pressed portion.

The above difference is only in the transmission path of rotation, and there is no difference in the obtained action and effect. Moreover, in the present embodiment, the first rotating body 72 is manually rotated, but it is also possible to electrically rotate the first rotating body by providing a drive means connecting portion in the first rotating body and connecting a rotation drive means to the drive means connecting portion.

Figure 21A:
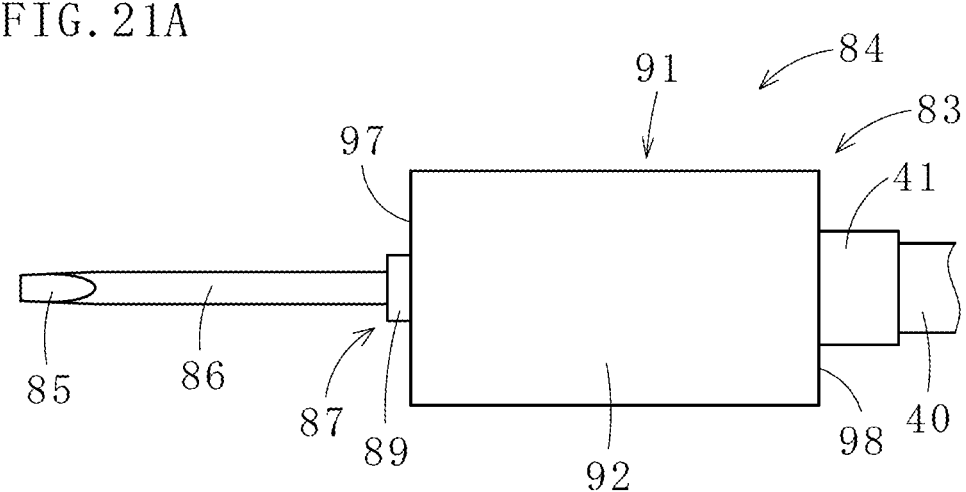
FIG. 21A is a plan view of an assist-attached rotation tool provided with a rotation assist tool according to a fifth embodiment of the present invention.

Next, with reference to FIGS. 21 and 22, a rotation assist tool 83 and an assist-attached rotation tool 84 provided with the rotation assist tool 83 according to a fifth embodiment of the present invention will be described. The same components as those in the first to fourth embodiments are designated by the same reference signs as those in the first to fourth embodiments, and the description thereof will be omitted.

In the assist-attached rotation tool 84 provided with the rotation assist tool 83 illustrated in FIGS. 21A, 21B, 22A, and 22B, the rotation assist tool 83 is attached to the base side of a rotary shaft 86 having a flat-bladed screwdriver-shaped output unit 85 on the front side thereof.

In the rotation assist tool 83, a first rotating body 87 includes a main body portion 89 on one side of which a rotary shaft mounting portion 88 for fixing the base side of the rotary shaft 86 is formed. The method of fixing the rotary shaft 86 can be appropriately selected, but a method of fitting the base side of the rotary shaft 86 into the rotary shaft mounting portion 88 is preferably used. In particular, idling can be prevented by forming the base side of the rotary shaft 86 into a polygonal shape or by providing an anti-rotation protrusion on the outer circumference of the base side of the rotary shaft 86.

Figure 21B:
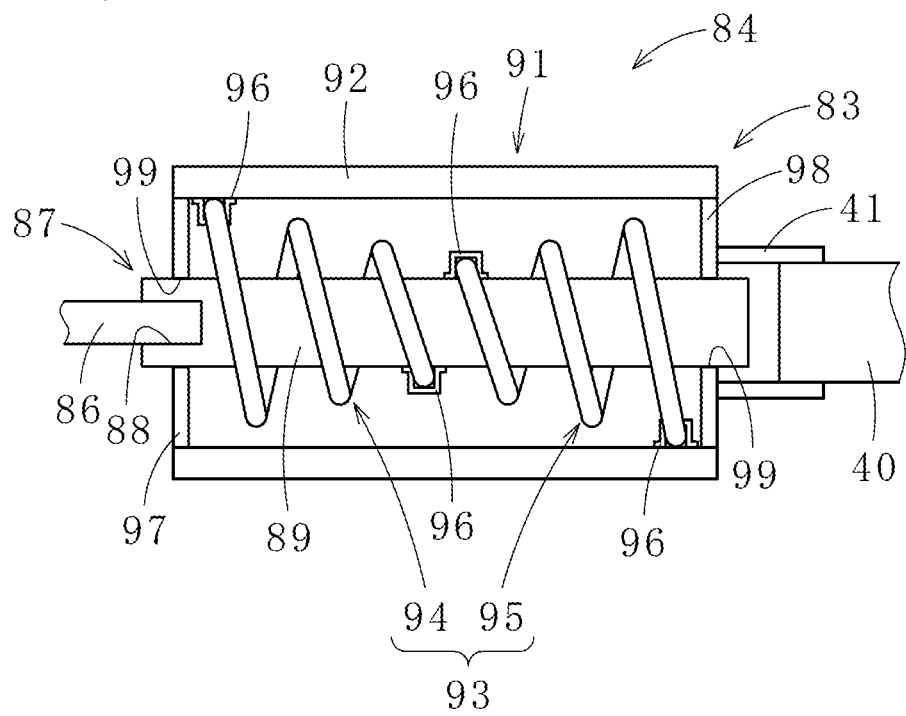
FIG. 21B is a partial longitudinal sectional view showing a state before the operation of the assist-attached rotation tool.
Figure 22A:
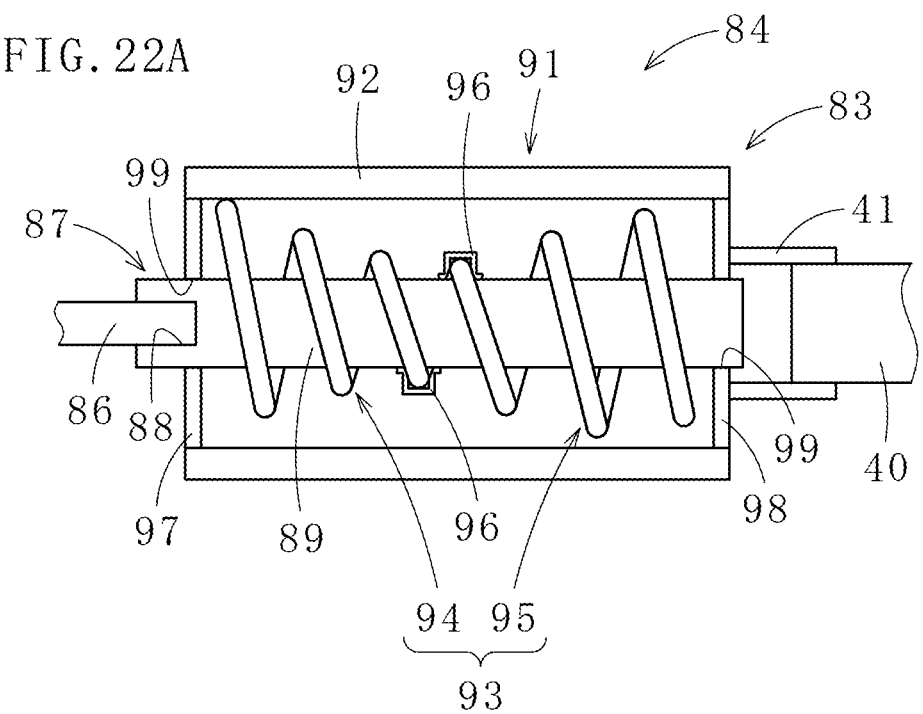
FIG. 22A is a partial longitudinal sectional view showing the first operation of the assist-attached rotation tool.
Figure 22B:
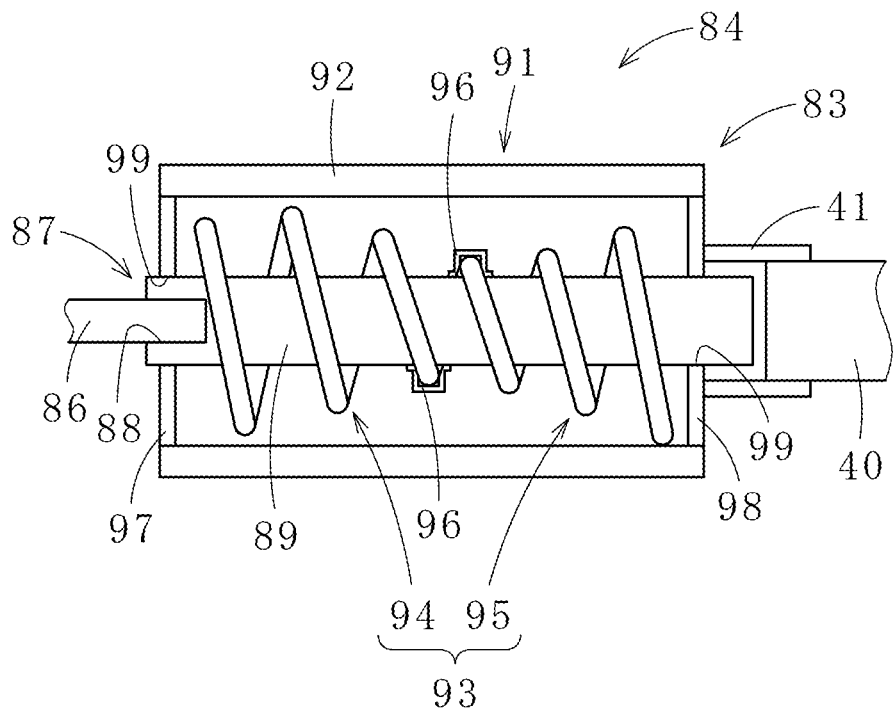
FIG. 22B is a partial longitudinal sectional view showing the second operation of the assist-attached rotation tool.

Next, a second rotating body 91 in the rotation assist tool 83 has an outer cylindrical portion 92 that covers the outer circumference of the first rotating body 87. Then, as illustrated in FIGS. 21B, 22A, and 22B, an elastically deformable body 93 includes a first elastically deformable portion 94 attached helically between the main body portion 89 and the outer cylindrical portion 92, and a second elastically deformable portion 95 attached helically between the main body portion 89 and the outer cylindrical portion 92. One side (here, the left side of each of the drawings) in a longitudinal direction of the first elastically deformable portion 94 is fixed to an inner circumferential surface of the outer cylindrical portion 92, and the other side (here, the right side of each of the drawings) is fixed to an outer circumferential surface of the main body portion 89. Additionally, the first elastically deformable portion 94 deforms from a neutral state toward a direction of reducing a diameter thereof (see FIG. 22A) during a forward rotation of the second rotating body 91 (here, upon rotating clockwise when viewed from the other side (the right side of FIG. 21B) in the axial direction of the second rotating body 91), and deforms from a neutral state toward a direction of increasing a diameter thereof (see FIG. 22B) during a reverse rotation of the second rotating body 91 (here, upon rotating counterclockwise when viewed from the other side (the right side of FIG. 21B) in the axial direction of the second rotating body 91). One side (here, the left side of each of the drawings) in a longitudinal direction of the second elastically deformable portion 95 is fixed to an outer circumferential surface of the main body portion 89, and the other side (here, the right side of each of the drawings) is fixed to an inner circumferential surface of the outer cylindrical portion 92. Additionally, the second elastically deformable portion 95 deforms from a neutral state toward a direction of increasing a diameter thereof (see FIG. 22A) during a forward rotation of the second rotating body 91, and deforms from a neutral state toward a direction of reducing a diameter thereof (see FIG. 22B) during a reverse rotation of the second rotating body 91.

In FIG. 22A, due to the forward rotation of the second rotating body 91, the first elastically deformable portion 94 deforms from a neutral state toward a direction of reducing a diameter thereof (the first elastically deformable portion 94 deforms in the direction of winding around the main body portion 89), and the second elastically deformable portion 95 deforms from a neutral state toward a direction of increasing a diameter thereof (the second elastically deformable portion 95 deforms in the direction of being wound from the main body portion 89). At this time, the pitch of the spiral of the first elastically deformable portion 94 is narrower than that in the neutral state, and the pitch of the spiral of the second elastically deformable portion 95 is wider than that in the neutral state. Therefore, the first rotating body 87 (the main body portion 89) moves toward one side of the second rotating body 91.

In FIG. 22B, due to the reverse rotation of the second rotating body 91, the first elastically deformable portion 94 deforms from a neutral state toward a direction of increasing a diameter thereof (the first elastically deformable portion 94 deforms in the direction of being wound from the main body portion 89), and the second elastically deformable portion 95 deforms from a neutral state toward a direction of reducing a diameter thereof (the second elastically deformable portion 95 deforms in the direction of winding around the main body portion 89). At this time, the pitch of the spiral of the first elastically deformable portion 94 is wider than that in the neutral state, and the pitch of the spiral of the second elastically deformable portion 95 is narrower than that in the neutral state. Therefore, the first rotating body 87 (the main body portion 89) moves toward the other side of the second rotating body 91. Incidentally, even when the first rotating body 87 moves toward the other side of the second rotating body 91, if the output unit 85 is used by pressing it against the head of a slotted head screw (an example of an object), the slotted head screw can be rotated without any problem.

As the elastically deformable body 93, a metal coil spring is preferably used, but the pitch and the number of turns of the spiral can be appropriately selected. In addition, by forming the first elastically deformable portion 94 and the second elastically deformable portion 95 in flat shapes like royal ferns, compactness can be achieved. The first elastically deformable portion 94 and the second elastically deformable portion 95 may be integrally (continuously) formed, or may be divided at the central portion in the longitudinal direction of the main body portion 89. One and the other ends of the first elastically deformable portion 94 are respectively fixed to the outer cylindrical portion 92 and the main body portion 89 by the fixing portions 96, and one and the other ends of the second elastically deformable portion 95 are respectively fixed to the main body portion 89 and the outer cylindrical portion 92 by the fixing portions 96. However, the shape of the fixing portion 96 and its fixing method can be appropriately selected.

Furthermore, first and second protective plates 97 and 98 are attached to both ends in the longitudinal direction of the second rotating body 91 (outer cylindrical portion 92). Insertion holes 99 through which the main body portion 89 is inserted are formed in the first and second protective plates 97 and 98. By forming the hole diameter of each of the insertion holes 99 larger than the outer diameter of the main body portion 89 (providing a gap between the outer circumference of the main body portion 89 and the inner circumference of each of the insertion holes 99), the main body portion 89 and the insertion hole 99 do not interfere with each other, and smooth rotation can be obtained, when rotating the first rotating body 87 and the second rotating body 89 relative to each other. Incidentally, a beating may be attached instead of providing a gap between the main body portion 89 and the insertion hole 99.

Since the first rotating body 87 (the main body portion 89) and the second rotating body 91 (the outer cylindrical portion 92) are supported by the elastically deformable body 93 so that their axes are substantially aligned with each other, either one or both of the second protective plates 97 and 98 can be omitted. However, by providing these, foreign matter can be prevented from entering the inside of the second rotating body 91. Thereby, the elastically deformable body 93 can be protected and the stability and durability of the operation of the rotation assist tool 83 can be improved.

In this embodiment, the drive means connecting portion 41 for connecting the drive shaft 40 of the rotation drive means (not illustrated) such as an electric motor is formed on the outside of the second protective plate 98, but it is also possible to omit the second protective plate 98 and provide a drive means connecting portion on the outer cylindrical portion 92. Additionally, in the present embodiment, the second rotating body 91 is rotated by the rotation drive means, but the second rotating body may be manually rotated by providing a grip portion (handle) instead of the drive means connecting portion on the other side of the second rotating body (the outer cylindrical portion or the second protective plate). Alternatively, the second rotating body can be rotated by directly gripping the outer cylindrical portion with providing neither the drive means connecting portion nor a grip portion (handle).

The assist-attached rotation tool can be used for various purposes by changing the shape of the output unit. Further, the rotation assist tool 83 can be attached to the base side of the rotary shaft having the input unit on the front side thereof, instead of the rotary shaft 86 having the output unit 85 on the front side thereof, In that case, the first rotating body can be rotated together with the rotary shaft by the rotational energy input from the input unit, and the rotation can be transmitted to the second rotating body via the elastically deformable body.

Next, with reference to FIG. 23, a rotation assist tool 100 and an assist-attached rotation tool 101 provided with the rotation assist tool 100 according to a sixth embodiment of the present invention will be described. The same components as those in the first to fifth embodiments are designated by the same reference signs as those in the first to fifth embodiments, and the description thereof will be omitted.

Figure 23A:
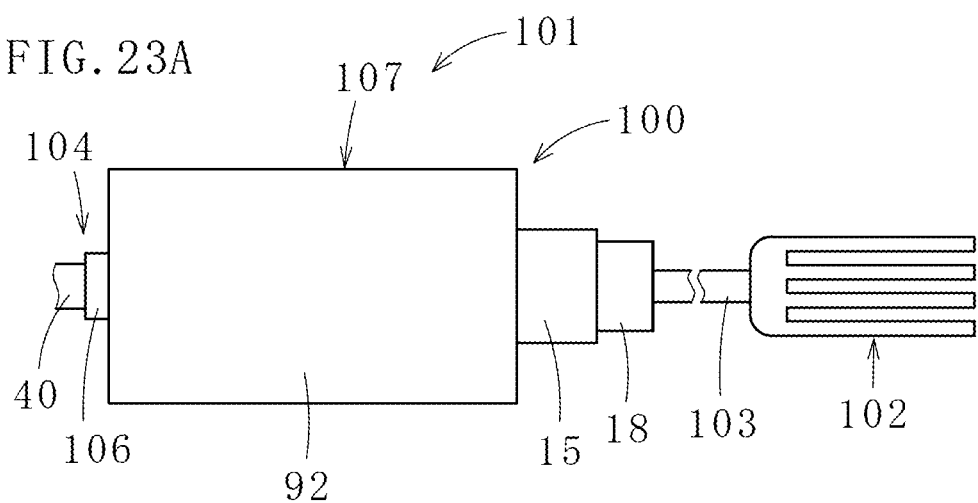
FIG. 23A is a plan view of an assist-attached rotation tool provided with a rotation assist tool according to a sixth embodiment of the present invention.
Figure 23B:
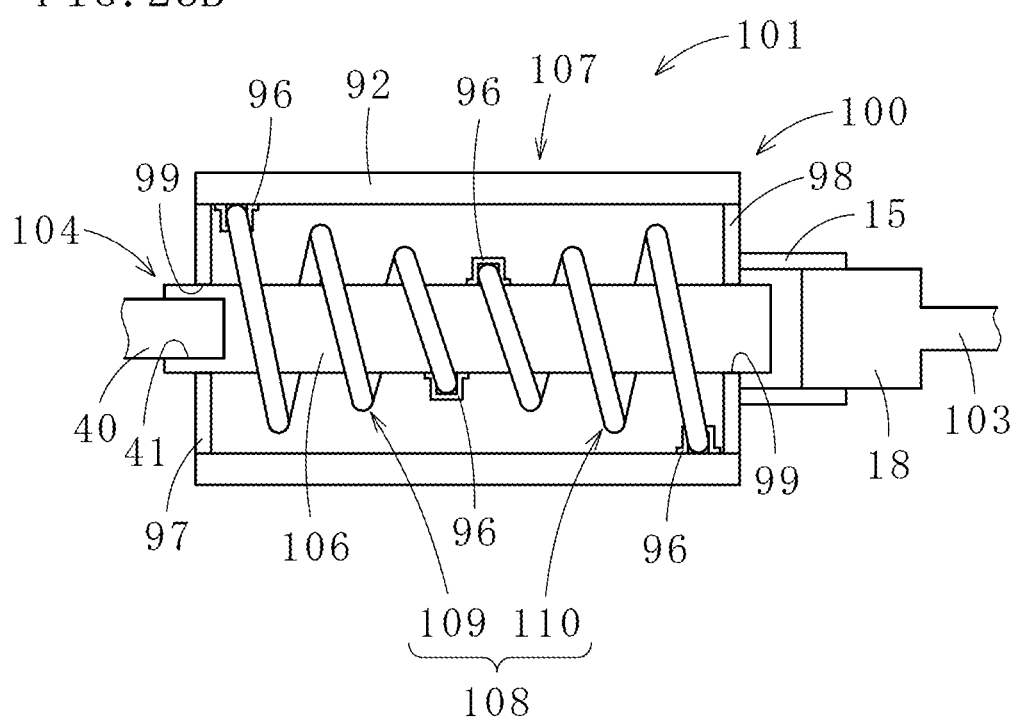
FIG. 23B is a partial longitudinal sectional view showing a state before the operation of the assist-attached rotation tool.

In the assist-attached rotation tool 101 provided with the rotation assist tool 100 illustrated in FIGS. 23A and 23B, the rotation assist tool 100 is attached to the base side of a rotary shaft 103 having a rotary blade-shaped output unit 102 such as a hand mixer on the front side thereof.

In the rotation assist tool 100, as illustrated in FIG. 23B, the drive means connecting portion 41 for connecting the drive shaft 40 of the rotation drive means (not illustrated) such as an electric motor is formed on one side of a main body portion 106 of a first rotating body 104.

Furthermore, in the rotation assist tool 100, the rotary shaft mounting portion 15 for fixing the shaft fixing portion 18 formed on the base side of the rotary shaft 103 is provided on the other side (outside of the second protective plate 98) of a second rotating body 107 having the outer cylindrical portion 92 on one side thereof. Then, as illustrated in FIG. 23B, an elastically deformable body 108 includes a first elastically deformable portion 109 attached helically between the main body portion 106 and the outer cylindrical portion 92, and a second elastically deformable portion 110 attached helically between the main body portion 106 and the outer cylindrical portion 92. One side (here, the left side of the drawing) in a longitudinal direction of the first elastically deformable portion 109 is fixed to an inner circumferential surface of the outer cylindrical portion 92, and the other side (here, the right side of the drawing) is fixed to an outer circumferential surface of the main body portion 106. Additionally, the first elastically deformable portion 109 deforms from a neutral state toward a direction of reducing a diameter thereof during a forward rotation of the first rotating body 104 (here, upon rotating clockwise when viewed from one side (the left side of FIG. 23B) in the axial direction of the first rotating body 104), and deforms from a neutral state toward a direction of increasing a diameter thereof during a reverse rotation of the first rotating body 104 (here, upon rotating counterclockwise when viewed from one side (the left side of FIG. 23B) in the axial direction of the first rotating body 104). One side (here, the left side of the drawing) in a longitudinal direction of the second elastically deformable portion 110 is fixed to an outer circumferential surface of the main body portion 106, and the other side (here, the right side of the drawing) is fixed to an inner circumferential surface of the outer cylindrical portion 92. Additionally, the second elastically deformable portion 110 deforms from a neutral state toward a direction of increasing a diameter thereof during a forward rotation of the first rotating body 104, and deforms from a neutral state toward a direction of reducing a diameter thereof during a reverse rotation of the first rotating body 104.

Since the shape, structure, material, etc. of the elastically deformable body 108 (the first elastically deformable portion 109 and the second elastically deformable portion 110) are the same as those of the elastically deformable body 93 (the first elastically deformable portion 94 and the second elastically deformable portion 95), the description thereof will be omitted.

The assist-attached rotation tool 101 can rotate the first rotating body 104 with the rotational energy input from the drive shaft 40, transmit the rotation to the second rotating body 107 via the elastically deformable body 108, and output the rotation from the output unit 102 by rotating the rotary shaft 103 together with the second rotating body 107.

The difference between the rotation assist tool 100 and the assist-attached rotation tool 101, and the rotation assist tool 83 and the assist-attached rotation tool 84 described above lies only in the transmission path of rotation, and there is no difference in the obtained actions and effects.

Next, a rotation assist tool 111 according to a seventh embodiment of the present invention will be described with reference to FIGS. 24, 25A, and 25B.

Figure 24:
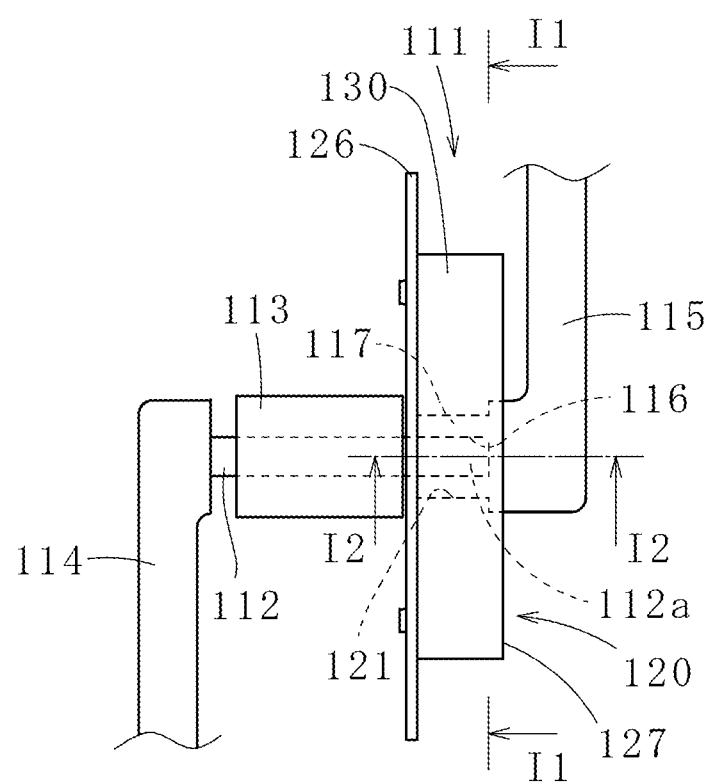
FIG. 24 is a plan view of a main part of a bicycle provided with a rotation assist tool according to a seventh embodiment of the present invention.
Figure 25A:
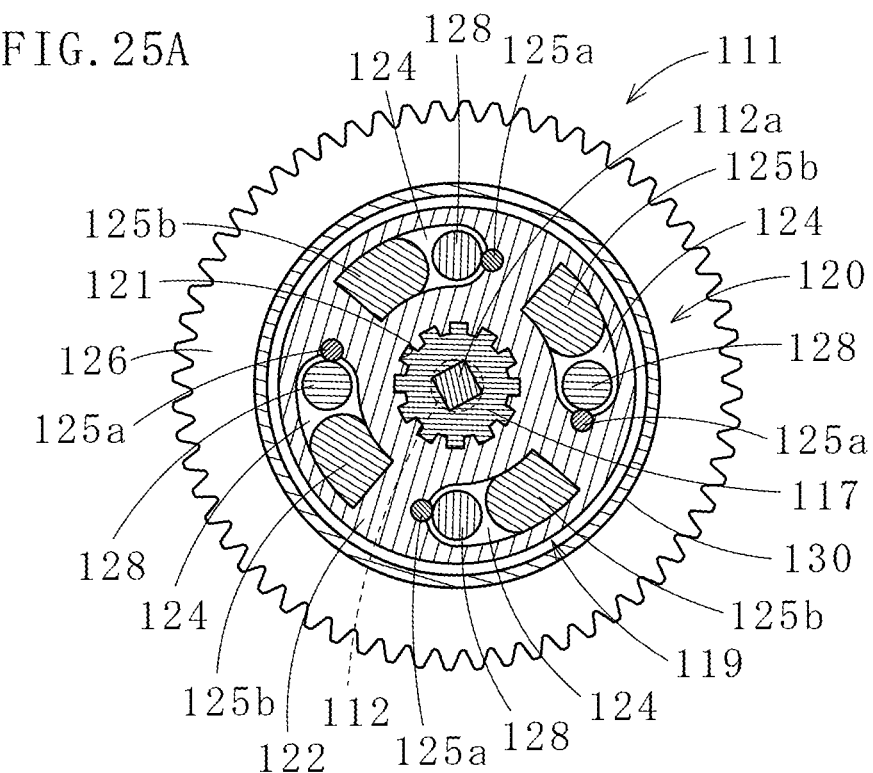
FIG. 25A is a cross-sectional view taken along the line I1-I1 of FIG. 24.
Figure 25B:
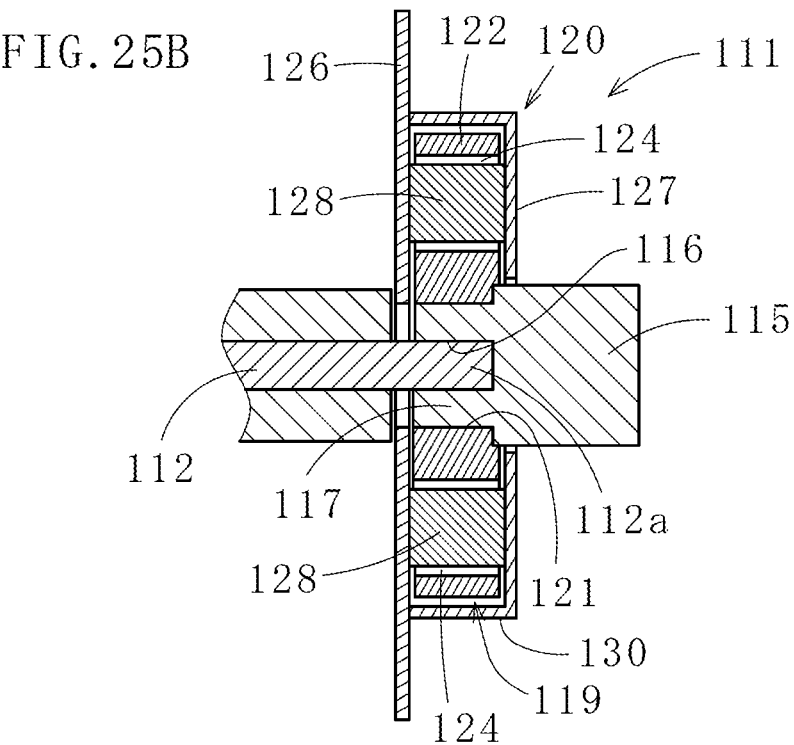
FIG. 25B is a cross-sectional view taken along the line I2-I2 of FIG. 24.

The rotation assist tool 111 according to the seventh embodiment of the present invention illustrated in FIGS. 24, 25A, and 25B is attached to the base side of a rotary shaft 112 of an existing bicycle.

As illustrated in FIG. 24, the rotary shaft 112 is rotatably held by a shaft support portion 113 provided on a frame of the bicycle (not illustrated), and left and right crank arms 114 and 115 are respectively attached to the front side and the base side of the rotary shaft 112 with a phase difference of 180 degrees. Then, a pedal (not illustrated) is rotatably provided on the front side of each of the crank arms 114 and 115, and when the bicycle user (driver) pedals, the rotary shaft 112 together with the crank arms 114 and 115 rotates. Here, an insertion protrusion 112a having a quadrangular cross section is formed on the base side of the rotary shaft 112, and a rotary shaft holding portion 117 having a insertion hole 116 having a quadrangular cross-section through which the insertion protrusion 112a is inserted is formed on the base side of the crank arm 115. As a result, the crank arm 114 and the crank arm 115 are integrated via the rotary shaft 112. The crank arm 114 and the crank arm 115 need only be integrated (connected) via the rotary shaft 112, and the structure thereof is not limited to this embodiment and can be appropriately selected. For example, the rotary shaft and the crank arms may be connected by thickening the rotary shaft to form an insertion hole in the axis of the rotary shaft, and inserting the insertion protrusion formed on the base side of each of the crank arms into the insertion hole.

As illustrated in FIGS. 25A and 25B, the rotation assist tool 111 has a first rotating body 119 and a second rotating body 120 held by the first rotating body 119 so as to be rotatable in the forward and reverse directions. Then, the first rotating body 119 has a main body portion 122 with a rotary shaft mounting portion 121 to which the base side of the rotary shaft 112 is fixed. Here, the rotary shaft holding portion 117 of the crank arm 115 attached to the base side of the rotary shaft 112 is inserted and fixed to the rotary shaft mounting portion 121, so that the base side of the rotary shaft 112 is indirectly fixed to the rotary shaft mounting portion 121 via the rotary shaft holding portion 117. Incidentally, the structure for fixing the base side of the rotary shaft 112 to the rotary shaft mounting portion 121 is not limited to this, and can be appropriately selected depending on the structure of the rotary shaft and the crank arm. For example, as described above, in the case of a structure in which the insertion protrusion formed on the base side of the crank arm is inserted into the insertion hole formed in the rotary shaft to connect the rotary shaft and the crank arm, or a structure in which the rotary shaft and the crank arm are integrally formed, the base side of the rotary shaft is directly fixed to the rotary shaft mounting portion.

A plurality of arc-shaped space portions 124 that each penetrates the main body portion 122 in the axial direction and is each concentrically curved around the axial center of the main body portion 122 is formed in the main body portion 122, and an elastically deformable body 125a and an elastically deformable body 125b are housed on one side and the other side in the circumferential direction of each of the space portions, respectively. The shape and size of each elastically deformable body accommodated on one side and the other side in the circumferential direction of each space portion can be appropriately selected. The second rotating body 120 includes rotating plates 126, 127 on one side and the other side that are arranged facing each other on both sides in the axial direction of the main body portion 122, and a plurality of connecting shafts 128 that each passes between the elastically deformable body 125a and the elastically deformable body 125b accommodated on one side and the other side in the circumferential direction of each of the space portions 124 and penetrates the space portion 124, and connects the rotating plates 126, 127 on one side and the other side. Incidentally, in this embodiment, the chain ring of the bicycle is used as the rotating plate 126 on one side, but the chain ring may be attached to a rotating plate provided separately.

The base side of the rotary shaft 112 penetrates the rotating plate 126 on one side and is fixed to the main body portion 122, and the second rotating body 120 can rotate in forward and reverse directions with respect to the rotary shaft 112 and the first rotating body 119. The second rotating body 120 has a cylindrical portion 130 that covers the outer circumference of the first rotating body 119 and connects the rotating plates 126, 127. As a result, the first rotating body 119 can be protected by the second rotating body 120 to prevent foreign matter such as dust from entering the inside of the second rotating body 120, and stable operation is possible.

In the rotation assist tool 111 configured as described above, by inputting rotational energy from the rotary shaft 112 via the crank arms 114, 115, the first rotating body 119 together with the rotary shaft 112 is rotated, the elastically deformable body 125b is pressed against the connecting shaft 128 in each space portion 124, and the rotational energy is transmitted to the second rotating body 120 and output from the rotating plate (chain ring) 126. Therefore, while the first rotating body 119 and the second rotating body 120 rotate relatively, the elastically deformable bodies 125b are elastically deformed to accumulate a part of the input energy, and the load at the time of initial movement (at the start of operation) can be reduced. Then, when the input energy (rotation of the first rotating body 119) is interrupted or weakened during the rotation, the elastically deformable bodies 125b are appropriately restored to convert the accumulated elastic energy into rotational energy. The second rotating body 120 can be rotated by effectively utilizing the rotational energy. Therefore, in the bicycle 140 (see FIG. 28) equipped with the rotation assist tool 111, the input energy can be reduced and the load of the driver of the bicycle 140 can be reduced. For example, even if the input energy becomes small or is likely to be interrupted on a slope or the like, it is possible to suppress fluctuations in output energy and perform stable driving. Further, the elastically deformable body 125a functions as a damper to prevent the connecting shaft 128 from directly colliding with the main body portion 122.

Figure 29:
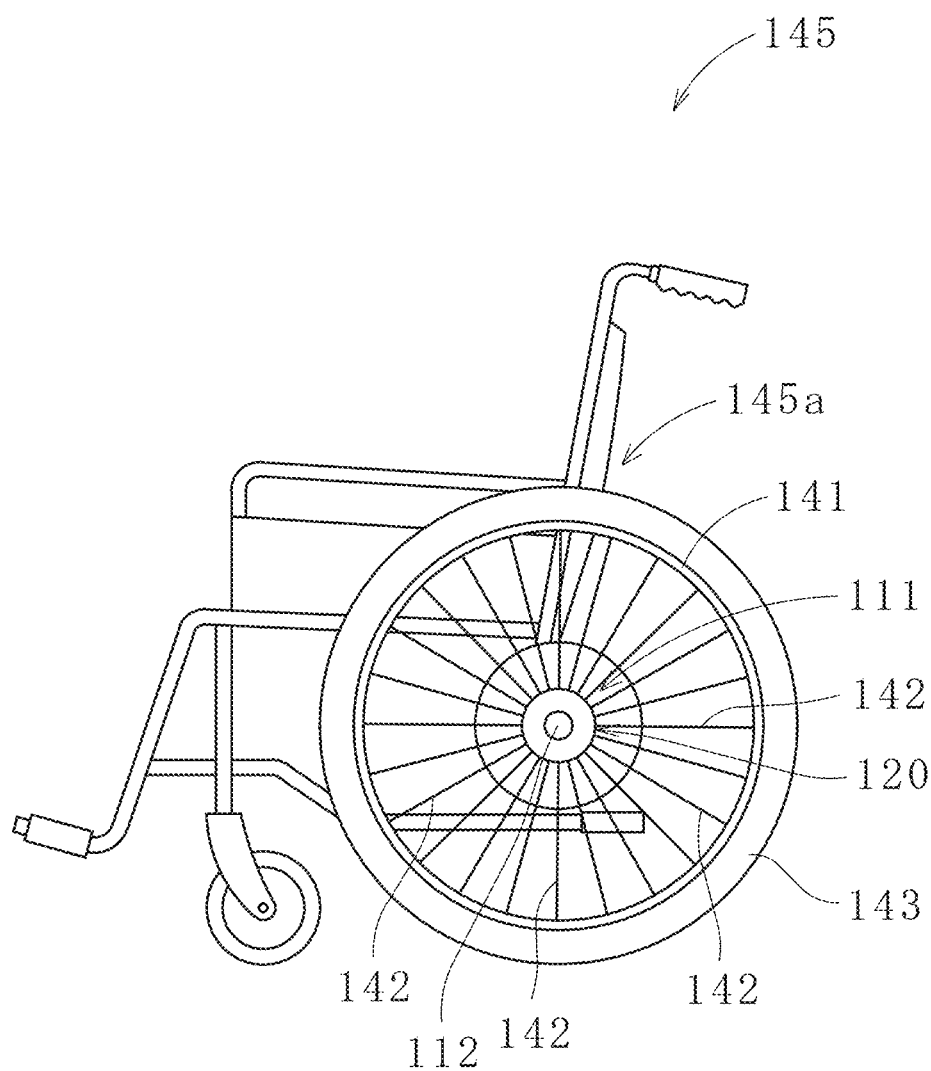
FIG. 29 is a side view of a wheelchair according to the present invention.
Figure 30:
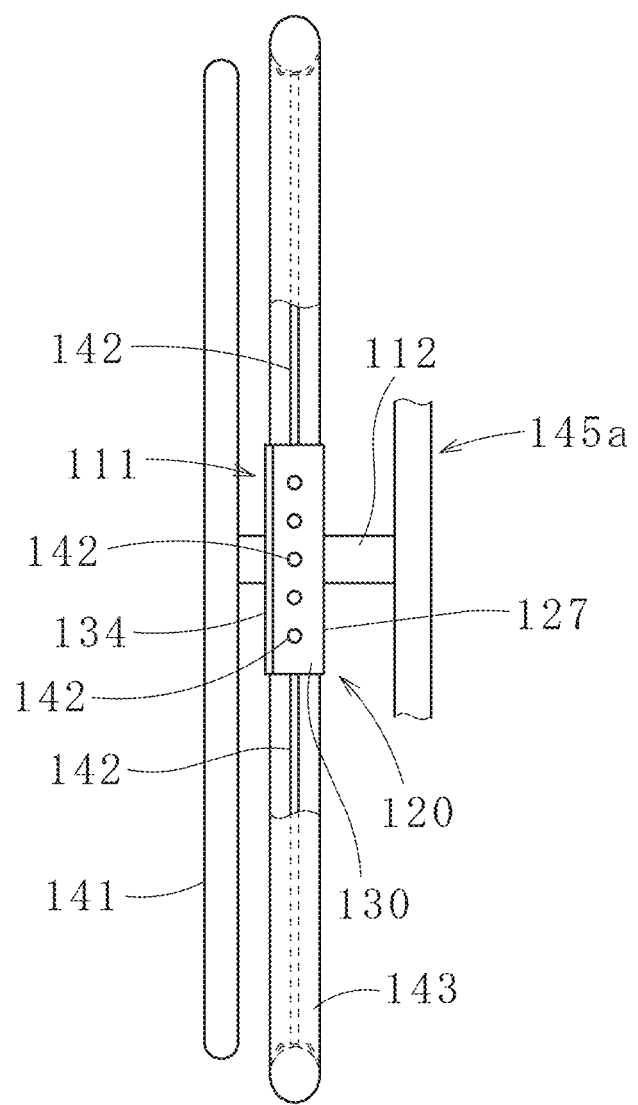
FIG. 30 is a sectional-plan view of a main part of the wheelchair.

Incidentally, in this embodiment, the case where the rotation assist tool 111 is applied to the rotary shaft (drive shaft) 112 of the bicycle 140 has been described. However, as illustrated in FIGS. 29 and 30, if a hand rim 141 instead of the crank is connected to the rotary shaft 112, and a wheel 143 instead of the chain ring is attached to the second rotating body 120 (cylindrical portion 130) via a plurality of spokes 142 provided radially on the outer circumference of the second rotating body 120, the rotation assist tool can be applied to a wheelchair 145. Furthermore, it can also be applied to a fishing reel, a winch or the like. Additionally, this rotation assist tool can also be applied to a rotary shaft (drive shaft) 112 of a car, a motorcycle 150 illustrated in FIG. 31 or the like driven by a motor, etc.

Next, a rotation assist tool 131 according to an eighth embodiment of the present invention will be described with reference to FIGS. 26 and 27. The same components as those in the seventh embodiment are designated by the same reference signs as those in the seventh embodiment, and the description thereof will be omitted.

Figure 26:
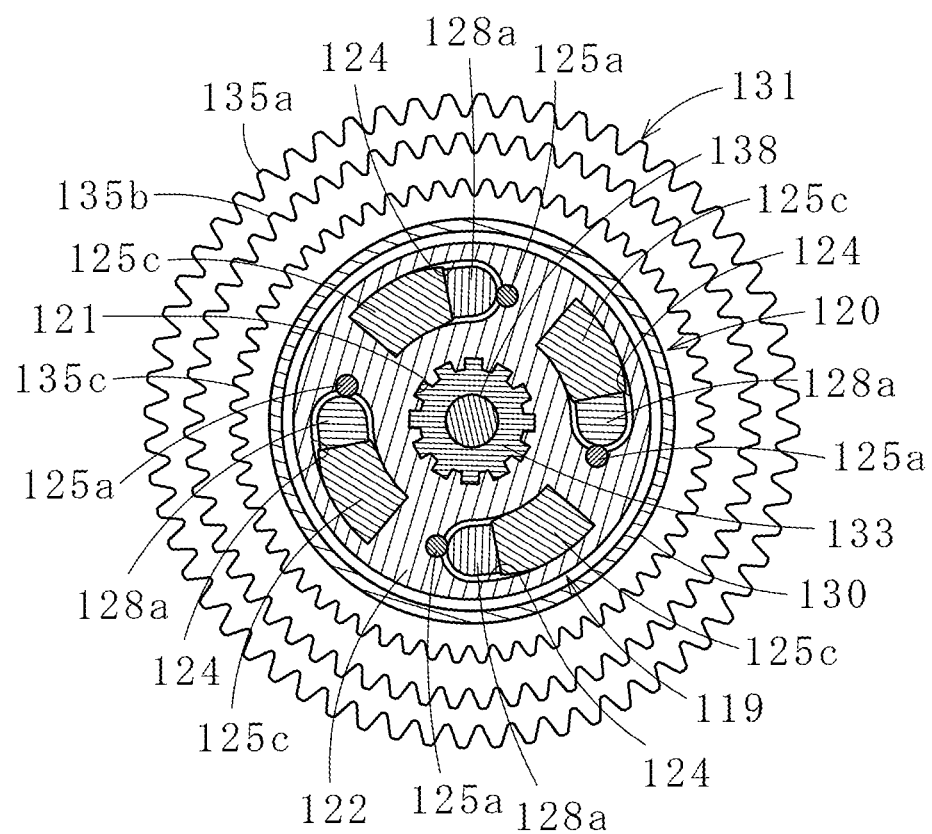
FIG. 26 is a longitudinal sectional view of a main part of a rotation assist tool according to a eighth embodiment of the present invention.
Figure 27:
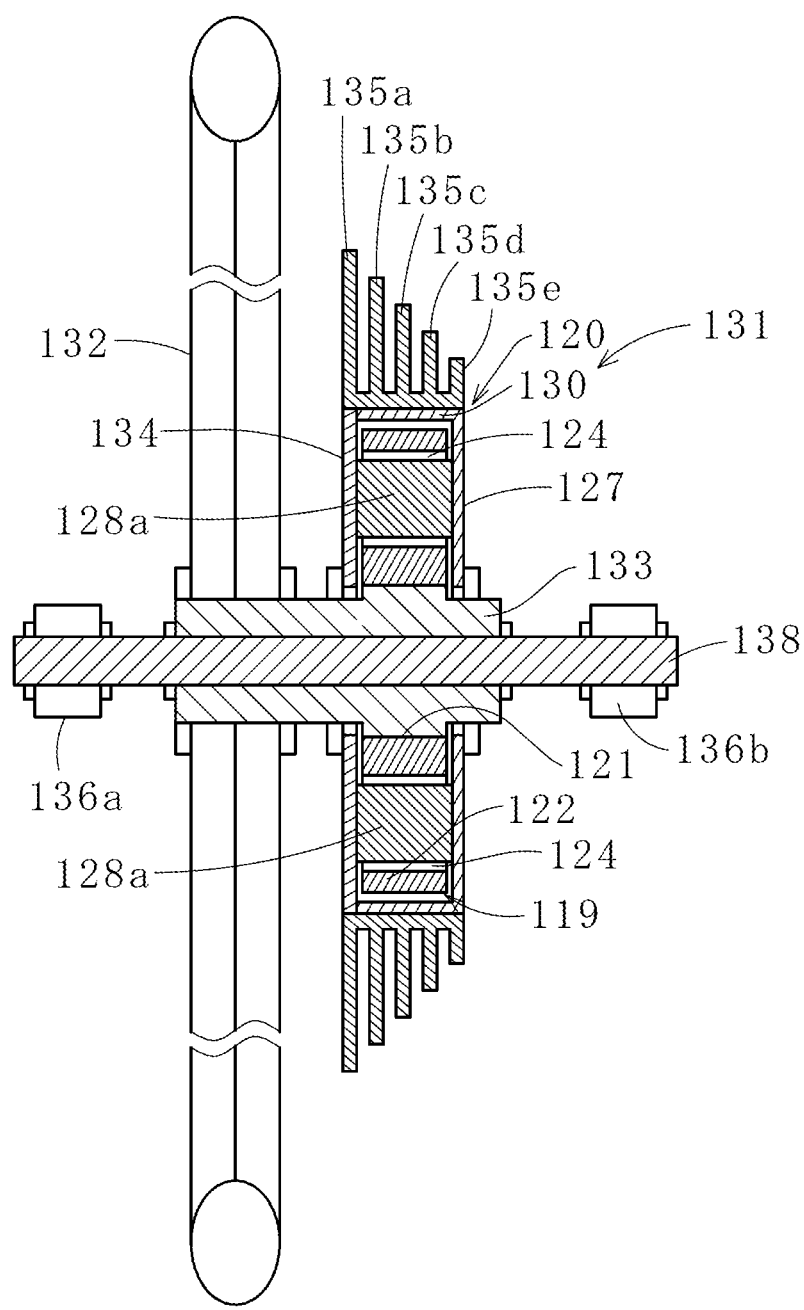
FIG. 27 is a transverse sectional view of the rotation assist tool.
Figure 28:
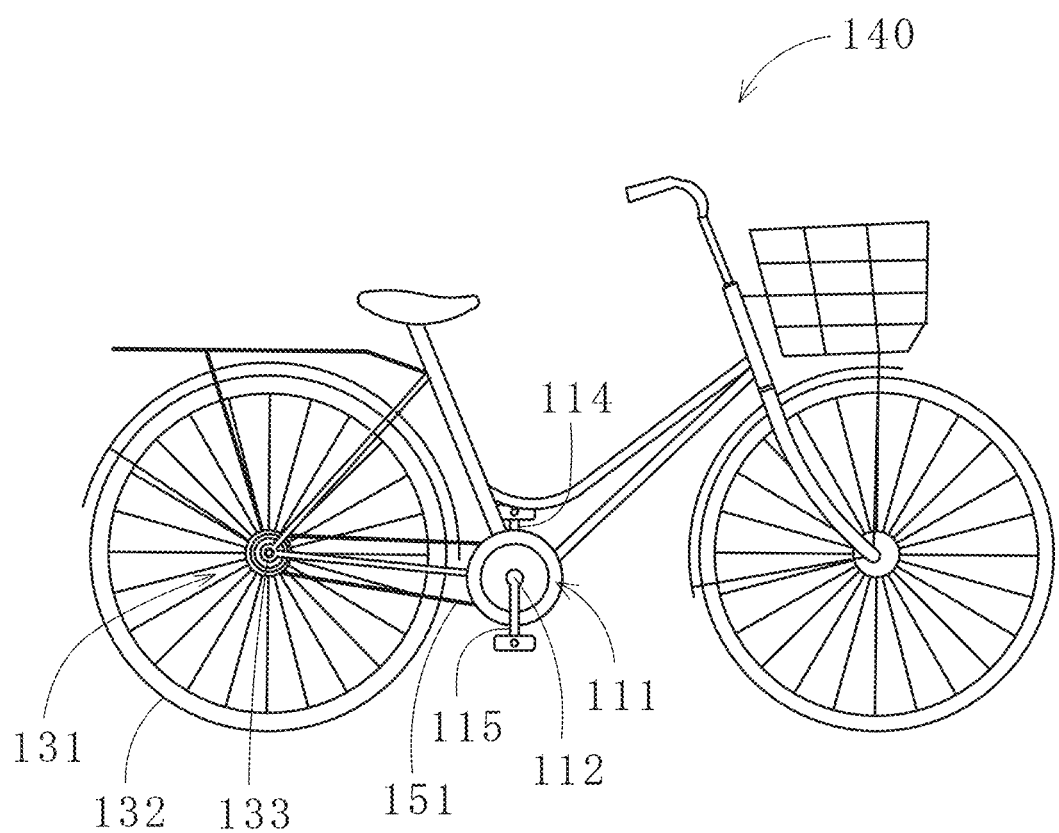
FIG. 28 is a side view of a bicycle according to the present invention.

The rotation assist tool 131 illustrated in FIGS. 26 and 27 differs from the rotation assist tool 111 in that it is attached to the base side of a rotary shaft (driven shaft) 133 of the rear wheel 132 of an existing bicycle 140 (see FIG. 28). Further, in the rotation assist tool 111, the chain ring is used as the rotation plate 126 on one side, but in the rotation assist tool 131, a rotation plate 134 is provided on one side of the second rotating body 120, and a plurality of (here, five) sprockets (gears) 135a to 135e for shifting are attached to the outer circumference of the second rotating body 120 (the cylindrical portion 130). Then, the rotary shaft 133 is rotatably supported by a fixed shaft 138 whose both ends are held by the side frames 136a and 136b of the bicycle 140.

In the rotation assist tool 131 configured as described above, rotation energy is input to the second rotating body 120 via a chain 151 wound around any one of the sprockets (gears) 135a to 135e, so that the connecting shaft 128a is pressed against the elastically deformable body 125c in each of the space portions 124, the rotational energy is transmitted to the first rotating body 119, the rotary shaft 133 rotates together with the first rotating body 119, and the rotational energy is output from the rear wheel 132. Therefore, while the first rotating body 119 and the second rotating body 120 rotate relatively, a part of the input energy can be stored by elastically deforming the elastically deformable bodies 125c, and the rotation assist tool 131 can obtain the same operation and effect as the rotation assist tool 111.

Incidentally, in the rotation assist tool 131, the cross-sectional shape of the connecting shaft 128a is formed in a semicircular shape or a bullet shape, and the contact surface between the connecting shaft 128a and the elastically deformable body 125c accommodated on one side in the circumferential direction of each space portion 124 is made planer (flat) so that the elastic energy stored in the elastically deformable bodies 125c can be efficiently used. The shapes of the connecting shaft 128a and the elastically deformable body 125c can also be applied to the connecting shaft and the elastically deformable body of the rotation assist tool 111.

Figure 31:
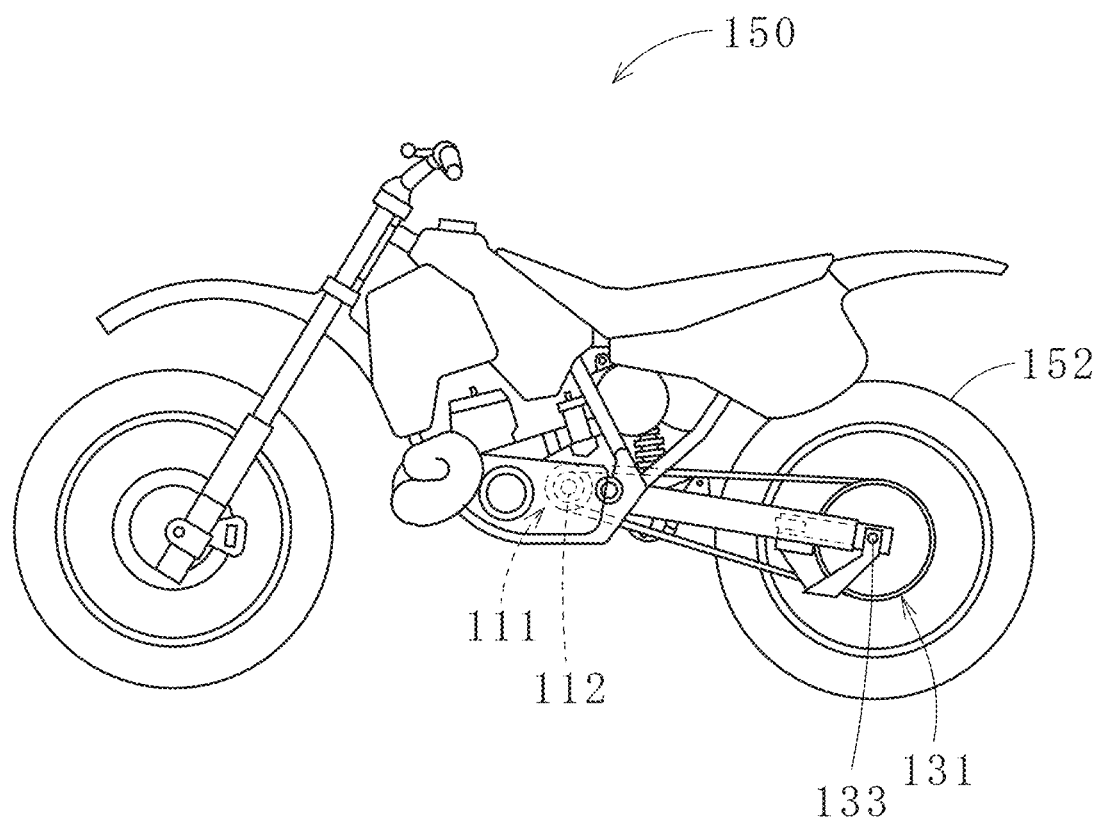
FIG. 31 is a side view of a motorcycle according to the present invention.

In the present embodiment, the case where the rotation assist tool 131 is applied to the rotary shaft (driven shaft) 133 of the rear wheel of the bicycle 140 has been described. However, the rotation assist tool 131 can be similarly applied to the rotary shaft (driven shaft) 133 of the rear wheel 152 of a motorcycle 150 as illustrated in FIG. 31, etc.

Although the embodiments of the present invention have been described above, the present invention is not limited to the structures described in the above embodiments and includes other embodiments and variations conceivable within the scope of matters described in the scope of claims, and any changes and the like made under the conditions that do not deviate from the gist are within the scope of the present invention. Additionally, the present invention can also be applied when a rotation assist tool and an assist-attached rotation tool are constituted by combining the components of the rotation assist tool and the assist-attached rotation tool according to each of the embodiments.

Of the parts constituting the rotation assist tool and the assist-attached rotation tool, a metal such as stainless steel is preferably used as the material of the parts for which the material is not specified, but depending on the application, the magnitude of the driving force (torque) and the like, various materials can be appropriately selected, and synthetic resin (including reinforced plastic) or wood can also be used.

The assist-attached rotation tool can be configured by attaching the rotation assist tool to the base side of the rotary shift of an existing tool or the like. However, when a new assist-attached rotation tool is manufactured, the rotary shaft thereof can be attached to and detached from the rotation assist tool, or can be formed integrally with the rotation assist tool.

INDUSTRIAL APPLICABILITY

By incorporating a rotation assist tool into a rotary shift of an object such as an existing rotation tool and a bicycle, the rotation energy input from the outside is efficiently transmitted to assist the rotation of the rotary shift, the burden on a worker (user) who use the object is reduced, and the object can be used effectively. In addition, by expanding the use of the assist-attached rotation tool with excellent operational stability, rotation transmission efficiency and labor saving, it is possible to contribute to the improvement of work efficiency and productivity.

REFERENCE SIGNS LIST

10: rotation assist tool, 11: output unit, 1 2: rotary shaft, 13: first rotating body, 14: second rotating body, 15: rotary shaft mounting portion, 16: main body portion, 17: first convex portion, 18: shaft fixing portion, 20: outer cylindrical portion, 21: second convex portion, 22: elastically deformable body, 24: first guide portion, 25: second guide portion, 26: first groove, 27: second groove, 28: guide groove, 29: protrusion, 30: guide means, 31: assist-attached rotation tool, 32: closing plate, 33: elastic member, 34: end surface, 36: rotation assist tool, 37: assist-attached rotation tool, 38: first rotating body, 39: main body portion, 40: drive shaft, 41: drive means connecting portion, 42: second rotating body, 43: rotary shaft mounting portion, 44: output unit, 45: rotary shaft, 46: rotation assist tool, 47: assist-attached rotation tool, 48: output unit, 49: rotary shaft, 50: first rotating body, 51: main body portion, 52: large diameter portion, 53: anti-rotation protrusion, 54: rotary shaft mounting portion, 56: space portion, 57: elastically deformable body, 59: second rotating body, 60: rotating plate on one side, 61: rotating plate on the other side, 62: connecting shaft, 64: small protrusion, 65: first cylindrical portion, 66: second cylindrical portion, 67: first guide portion, 68: second guide portion, 69: end surface, 70: rotation assist tool, 71: assist-attached rotation tool, 72: first rotating body, 73: main body portion, 74: rotary shaft insertion hole, 75: rotary shaft, 77: second rotating body, 78: rotary shaft mounting portion, 79: fitting joint protrusion, 80: rotary shaft fitting portion, 81: output unit, 82: end surface, 83: rotation assist tool, 84: assist-attached rotation tool, 85: output unit, 86: rotary shaft, 87: first rotating body, 88: rotary shaft mounting portion, 89: main body portion, 91: second rotating body, 92: outer cylindrical portion, 93: elastically deformable body, 94: first elastically deformable portion, 95: second elastically deformable portion, 96: fixing portion, 97: first protective plate, 98: second protective plate, 99: insertion hole, 100: rotation assist tool, 101: assist-attached rotation tool, 102: output unit, 103: rotary shaft, 104: first rotating body, 106: main body portion, 107: second rotating body, 108: elastically deformable body, 109: first elastically deformable portion, 110: second elastically deformable portion, 111: rotation assist tool, 112: rotary shaft, 112a: insertion protrusion, 113: shaft support portion, 114, 115: crank arm, 116: insertion hole, 117: rotary shaft holding portion, 119: first rotating body, 120: second rotating body, 121: rotary shaft mounting portion, 122: main body portion, 124: space portion, 125a, 125b, 125c: elastically deformable body, 126, 127: rotating plate, 128, 128a: connecting shaft, 130: cylindrical portion, 131: rotation assist tool, 132: rear wheel, 133: rotary shaft (driven shaft), 134: rotating plate, 135a to 135e: sprocket (gear), 136a, 136b: side frame, 138: fixed shaft, 140: bicycle, 141: hand rim, 142: spoke, 143: wheel, 145: wheelchair, 145a: wheelchair main body (frame), 150: motorcycle, 151: chain, 152: rear wheel

The invention claimed is:
1. A rotation assist tool attached to a base side of a drive shaft and used to assist a rotation of the drive shaft having an input unit on a front side thereof, comprising:
a first rotating body;
a second rotating body held by the first rotating body to be rotatable in forward and reverse directions; and
one or more elastically deformable bodies elastically deformed by relative rotation of the first rotating body and the second rotating body and transmitting rotation between the first rotating body and the second rotating body, wherein:
first rotating body includes a main body portion in which a drive shaft mounting portion that is mounted on the base side of the drive shaft is formed, a plurality of arc-shaped space portions penetrating the main body portion in an axial direction and curved concentrically around an axial center of the main body portion is formed in the main body portion, and each of the elastically deformable bodies is housed on one side and another side in a circumferential direction in each of the space portions;
the second rotating body includes rotating plates on one side and another side arranged to face each other on both sides in the axial direction of the main body portion, a plurality of connecting shafts each passing between the elastically deformable bodies housed on the one side and the another side in the circumferential direction in each of the space portions, penetrating each of the space portions and connecting the rotating plates on the one side and the another side, and a cylindrical portion that covers an outer circumference of the first rotating body and connects the rotating plates on the one side and the another side;
the second rotating body is rotatable in forward and reverse directions with respect to the drive shaft and the first rotating body; and
the rotating plate on the one side is a chain ring.
2. A bicycle comprising the rotation assist tool according to claim 1, wherein the rotation assist tool is attached to the base side of the drive shaft of the bicycle.
3. A motorcycle comprising the rotation assist tool according to claim 1, wherein the rotation assist tool is attached to the base side of the drive shaft of the motorcycle.
4. Rotation assist tool attached to a base side of a driven shaft and used to assist a rotation of the driven shaft having an output unit on a front side thereof, comprising:
a first rotating body;
a second rotating body held by the first rotating body to be rotatable in forward and reverse directions; and
one or more elastically deformable bodies elastically deformed by relative rotation of the first rotating body and the second rotating body and transmitting rotation between the first rotating body and the second rotating body, wherein:
the first rotating body includes a main body portion in which a driven shaft mounting portion that is mounted on the base side of the driven shaft is formed, a plurality of arc-shaped space portions penetrating the main body portion in an axial direction and curved concentrically around an axial center of the main body portion is formed in the main body portion, and each of the elastically deformable bodies is housed on one side and another side in a circumferential direction in each of the space portions;

the second rotating body includes rotating plates on one side and another side arranged to face each other on both sides in the axial direction of the main body portion, a plurality of connecting shafts each passing between the elastically deformable bodies housed on the one side and the another side in the circumferential direction in each of the space portions, penetrating each of the space portions and connecting the rotating plates on the one side and the another side, and a cylindrical portion that covers an outer circumference of the first rotating body and connects the rotating plates on the one side and the another side;

the second rotating body is rotatable in forward and reverse directions with respect to the driven shaft and the first rotating body; and a sprocket is attached to an outer circumference of the cylindrical portion.

5. A bicycle comprising the rotation assist tool according to claim 4, wherein the rotation assist tool is attached to the base side of the driven shaft of the bicycle.

6. A motorcycle comprising the rotation assist tool according to claim 4, wherein the rotation assist tool is attached to the base side of the driven shaft of the motorcycle.

7. A rotation assist tool attached to a base side of a rotary shaft of a wheelchair and used to assist a rotation of the rotary shaft having a hand rim as an input unit connected to a front side thereof, comprising:

a first rotating body;

a second rotating body held by the first rotating body to be rotatable in forward and reverse directions; and one or more elastically deformable bodies elastically deformed by relative rotation of the first rotating body and the second rotating body and transmitting rotation between the first rotating body and the second rotating body, wherein:

the first rotating body includes a main body portion in which a rotary shaft mounting portion that is mounted on the base side of the drive shaft is formed, a plurality of arc-shaped space portions penetrating the main body portion in an axial direction and curved concentrically around an axial center of the main body portion is formed in the main body portion, and each of the elastically deformable bodies is housed on one side and another side in a circumferential direction in each of the space portions;

the second rotating body includes rotating plates on one side and another side arranged to face each other on both sides in the axial direction of the main body portion, a plurality of connecting shafts each passing between the elastically deformable bodies housed on the one side and the another side in the circumferential direction in each of the space portions, penetrating each of the space portions and connecting the rotating plates on the one side and the another side, and a cylindrical portion that covers an outer circumference of the first rotating body and connects the rotating plates on the one side and the another side;

the second rotating body is rotatable in forward and reverse directions with respect to the rotary shaft and the first rotating body; and a wheel is attached to the second rotating body via a plurality of spokes provided radially on an outer circumference of the cylindrical portion.

8. A wheelchair comprising the rotation assist tool according to claim 7, wherein the rotation assist tool is attached to the base side of the rotary shaft of the wheelchair.

* * * * *